(12) United States Patent
Sriram et al.

(10) Patent No.: US 12,500,800 B2
(45) Date of Patent: Dec. 16, 2025

(54) REAL TIME PHYSICAL LAYER PROCESSING IN DISTRIBUTED UNITS

(71) Applicant: Outdoor Wireless Networks LLC, Richardson, TX (US)

(72) Inventors: Suresh N. Sriram, Bangalore (IN); Arthur J. Barabell, Sudbury, MA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 146 days.

(21) Appl. No.: 18/580,892

(22) PCT Filed: Jul. 20, 2022

(86) PCT No.: PCT/US2022/037749
§ 371 (c)(1),
(2) Date: Jan. 19, 2024

(87) PCT Pub. No.: WO2023/003969
PCT Pub. Date: Jan. 26, 2023

(65) Prior Publication Data
US 2025/0062942 A1    Feb. 20, 2025

(30) Foreign Application Priority Data
Jul. 21, 2021  (IN) .............................. 202141032860

(51) Int. Cl.
*H04L 27/26*   (2006.01)
*H04L 5/00*    (2006.01)
(52) U.S. Cl.
CPC ........ *H04L 27/2602* (2013.01); *H04L 5/0007* (2013.01)
(58) Field of Classification Search
CPC ............. H04L 27/2602; H04L 27/2603; H04L 27/26025; H04L 27/26035; H04L 5/0007; H04L 5/0005; H04L 5/0001
See application file for complete search history.

(56) References Cited

U.S. PATENT DOCUMENTS 10,652,874 B2 *  5/2020  Larsson ................ H04L 5/0053
2018/0234142 A1   8/2018  Murakami et al.
(Continued)

FOREIGN PATENT DOCUMENTS

| EP | 3806566 A1 | 4/2021 |
| WO | 2023003969 A1 | 1/2023 |

OTHER PUBLICATIONS

International Searching Authority, "International Search Report and Written Opinion", from PCT Application No. PCT/US2022/037749, Oct. 31, 2022, pp. 1 through 9, Published: WO.

(Continued)

*Primary Examiner* — Khanh C Tran
(74) *Attorney, Agent, or Firm* — Fogg & Powers LLC

(57) ABSTRACT

The present disclosure describes methods and apparatus for real-time physical layer processing in distributed units (DU). A downlink data processing method includes receiving a downlink transport block at the physical layer and generating a plurality of sub-transport blocks mapped to a plurality of symbols by processing the received transport block. The method further includes processing the plurality of sub-transport blocks sequentially using at least one transfer function to generate the plurality of symbols which are then transmitted to a radio unit (RU) for transmission to a user equipment (UE). An uplink data processing method includes generating an uplink transport block by processing a plurality of symbols received at the DU from the RU. The plurality of symbols are processed using at least one uplink transfer function. A downlink/uplink transfer function is functionally equivalent to a plurality of downlink/uplink sequential signal processing modules.

20 Claims, 13 Drawing Sheets

(56) References Cited

U.S. PATENT DOCUMENTS

| | | | |
|---|---|---|---|
| 2019/0109676 A1* | 4/2019 | Zhang | H04L 1/1812 |
| 2020/0145964 A1* | 5/2020 | Sengupta | H04L 1/0031 |
| 2021/0014737 A1 | 1/2021 | Yang et al. | |
| 2021/0058812 A1 | 2/2021 | Chai et al. | |
| 2021/0152298 A1* | 5/2021 | Beale | H04L 1/1835 |
| 2021/0345375 A1* | 11/2021 | Abotabl | H04W 72/535 |
| 2023/0345475 A1* | 10/2023 | Huang | H04L 1/1822 |

OTHER PUBLICATIONS

KDDI Corporation, "Considerations on inter-gBN coordination for NR", RWS-210140, 3GPP TSG RAN Rel-18 Workshop Electronic Meeting, Jun. 28-Jul. 2, 2021, Page(s) Cover through 11.

Haberland et al., "Base Stations in the Cloud", Alcatel-Lucent, Sep. 28, 2012, pp. 1 through 23, www.alcatel-lucent.com.

Zhu, ZhenBo et al., "Virtual Base Station Pool: Towards a Wireless Network Cloud for Radio Access Networks", May 17-19, 2010, pp. 1 through 10, Published in: Bertinoro, Italy.

\* cited by examiner

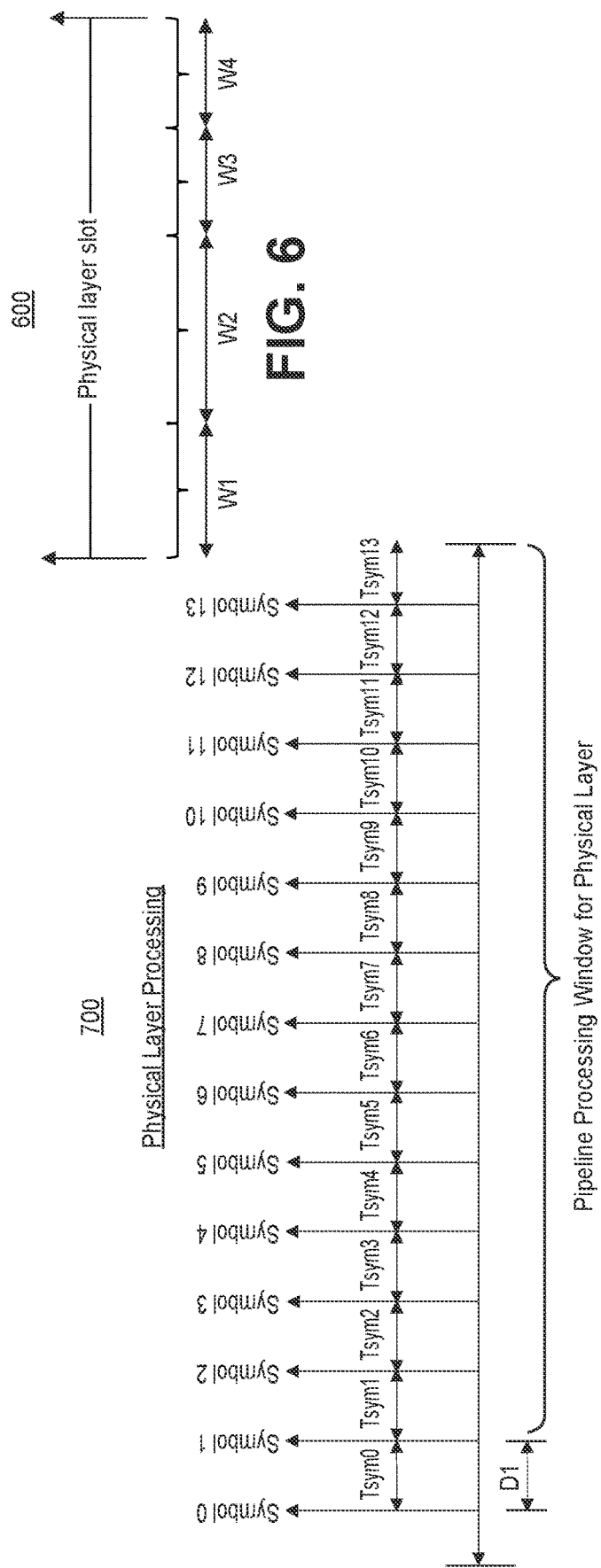
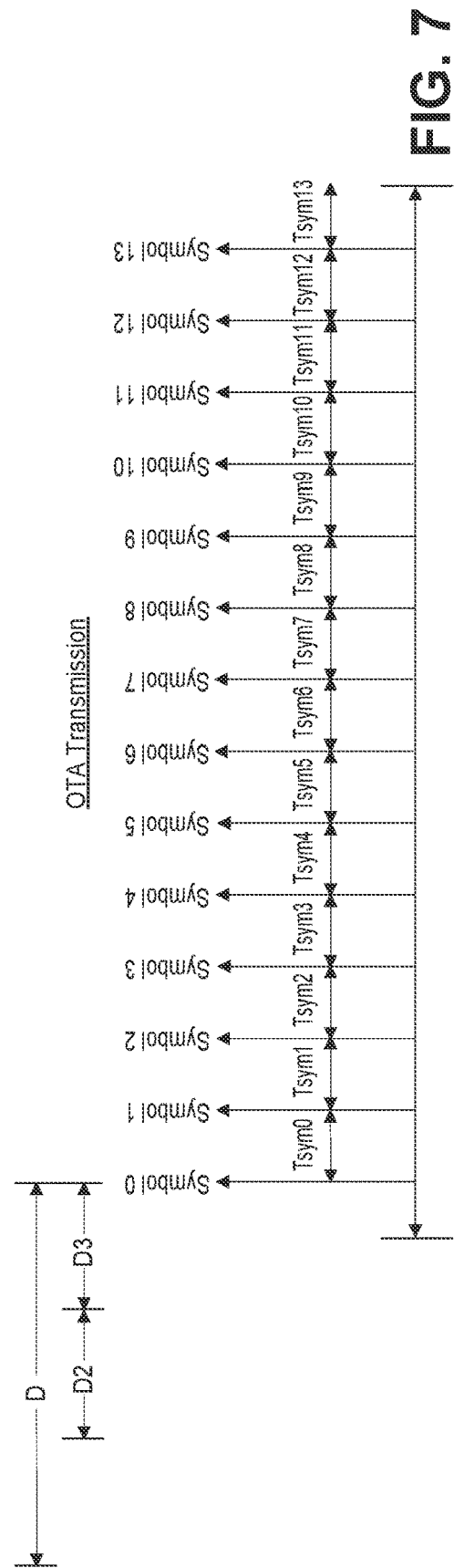
FIG. 6
FIG. 7

REAL TIME PHYSICAL LAYER PROCESSING IN DISTRIBUTED UNITS

CROSS-REFERENCE TO RELATED APPLICATIONS

This application is a U.S. National Stage of International Patent Application No. PCT/US2022/037749, filed on Jul. 20, 2022, and titled "REAL TIME PHYSICAL LAYER PROCESSING IN DISTRIBUTED UNITS," which claims the benefit of Indian Provisional Patent Application Serial No. 202141032860, filed on Jul. 21, 2021, which is hereby incorporated herein by reference in their entirety.

TECHNICAL FIELD

The present disclosure in general relates to wireless communication. More particularly, but not exclusively, to techniques for providing improved and real time physical layer processing in Distributed Units of a 5G radio access network (RAN).

BACKGROUND

Technology is constantly advancing and the advances in technology have resulted in rapid growth in the field of wireless communication technology. The latest advancement in wireless communication technology is the development of $5^{th}$ generation (5G) wireless systems. The 5G wireless systems aim to provide high reliability and throughput, lower latency, and support for a large number of devices compared to existing $4^{th}$ generation (4G) wireless systems. The 5G wireless systems also aim at improved support of machine-to-machine communication (i.e., Internet of things) at lower cost and lower power consumption compared to 4G wireless systems.

Radio access network (RAN) architecture of 5G (known as 5G RAN) introduces new terminologies, interfaces, and components. The 5G RAN has mainly three components—central unit (CU), distributed unit (DU), and remote unit (RU). The three components are inter-connected with each other via different interfaces and can be deployed in various combinations.

5G wireless systems are often deployed using cloud computing based architectures, where the CU and the DU are designed to be deployed in one or more clouds while the RU is designed to be deployed at a cell site. The DU provides support for the lower layers of the 5G protocol stack such as the Medium Access Control (MAC) layer and the physical layer. The DU may perform real time computations including channel coding, access network scheduling, link adaptation, accurate RU transmission and reception, power control, interference coordination, retransmission, modulation, Multiple-In Multiple-Out (MIMO) processing etc. The real time computations require high performance. Further, modern wireless systems (such as 5G) require on-demand scaling of computing resources to adapt to the changing demands of a deployment.

To support the on-demand scaling of computing resources, cloud computing centers use commercial-off-the-shelf (COTS) hardware (i.e., commercial platform) available from commercial sources. However, real time processing on the COTS hardware is challenging because computations per processor clock cycle for the COTS hardware are non-deterministic. Compensating for the non-deterministic behavior of the computations may add extra processing latency. Thus, real time processing on COTS hardware is extremely challenging. Some computations (e.g., low density parity check code, Rate Matching, Scrambling, Modulation) at the physical layer may require multiple operations per bit. For performing such computations on huge volumes of data, the COTS hardware may consume huge amounts of power and resources.

Nowadays, hardware accelerators are used in the 5G wireless systems for performing computationally intensive real time processing at the physical layer of the DU. Commonly used hardware accelerators may include Field Programmable Gate Arrays (FPGAs), Digital Signal Processors (DSPs), and Application-Specific Integrated Circuits (ASICs). The hardware accelerators are specialized hardware cards for performing intensive real time computations which are deployed/added into the COTS hardware. One challenge associated with the use of accelerator cards is that they are costly and consume extra power. Further, dependence on such accelerator cards negates the benefit of moving to COTS hardware and resource pooling and on demand scaling become far more challenging.

Thus, with the advancements in the technology, there exists a need for further improvements in the 5G and other wireless systems, especially for cost effective techniques that can perform real time computations at the physical layer of the DU (or other entity that performs such processing) while maintaining the benefits of cloud computing architectures.

Conventionally, there are no techniques available in the market that can address the above-identified problems. Hence, there exists a need for the technology that facilitates time and resource efficient techniques that can process huge amounts of data in real time at the physical layer of the DU (or other entity that performs such processing) without requiring any hardware accelerators.

The information disclosed in this background section is only for enhancement of understanding of the general background of the disclosure and should not be taken as an acknowledgement or any form of suggestion that this information forms the prior art already known to a person skilled in the art.

SUMMARY

One or more shortcomings discussed above are overcome, and additional advantages are provided by the present disclosure. Additional features and advantages are realized through the techniques of the present disclosure. Other embodiments and aspects of the disclosure are described in detail herein and are considered a part of the disclosure.

An objective of the present disclosure is to provide real time data processing in or for a distributed unit (DU) (or other entity that performs physical layer baseband processing) of a radio access network (RAN).

Yet another object of the present disclosure is to provide time and resource efficient techniques that can process huge amounts of data in real time at the physical layer without requiring any hardware accelerators.

The above stated objects as well as other objects, features, and advantages of the present disclosure will become clear to those skilled in the art upon review of the following description, the attached drawings, and the appended claims.

According to an aspect of the present disclosure, methods and apparatus are provided for real-time processing of data/signal/instructions in or for the DU (or other entity) of the RAN.

In one non-limiting embodiment of the present disclosure, a method includes receiving a downlink transport block at a physical layer of a distributed unit (DU) of a radio access network (RAN). The method may further include generating a plurality of sub-transport blocks by processing the received downlink transport block, where the plurality of sub-transport blocks are mapped to a plurality of symbols. The method may further include processing the plurality of sub-transport blocks sequentially to generate the plurality of symbols, where the plurality of sub-transport blocks are processed using at least one transfer function. The method may further include transmitting the plurality of symbols to a radio unit (RU) of the RAN for transmission to a user equipment (UE).

In another non-limiting embodiment of the present disclosure, the method may include buffering and processing the plurality of symbols at the RU and transmitting the processed symbols one by one over the air to the UE.

In another non-limiting embodiment of the present disclosure, transmitting the plurality of symbols to the RU may include transmitting one symbol of the plurality of symbols at a time to the RU.

In another non-limiting embodiment of the present disclosure, transmitting the plurality of symbols to the RU may include transmitting multiple symbols of the plurality of symbols at a time to the RU.

In another non-limiting embodiment of the present disclosure, a time difference between the generation of a symbol at the DU and transmission of the symbol to the UE may include time consumed in the transmission of the symbol from the DU to the RU and time taken by the RU for buffering and processing the symbol.

In another non-limiting embodiment of the present disclosure, each transfer function of the at least one transfer function may be functionally equivalent to a plurality of sequential downlink signal processing modules.

In another non-limiting embodiment of the present disclosure, each symbol of the plurality of symbols may be an orthogonal frequency division multiplexing (OFDM) symbol.

In a further non-limiting embodiment of the present disclosure, a method may comprise receiving a plurality of symbols sequentially at a physical layer of a distributed unit (DU) of a radio access network (RAN), where the plurality of symbols may comprise at least one set of symbols, where each set of the at least one set of symbols comprises at least one first symbol followed by a second symbol, and where the second symbol is a reference symbol. The method may further comprise generating at least one sub-transport block by processing each of the at least one set of symbols upon reception of a corresponding reference symbol, where the at least one set of symbols is processed using at least one transfer function. The method may further comprise generating an uplink transport block for conveyance to a Medium Access Control layer of the DU by processing the generated at least one sub-transport block.

In another non-limiting embodiment of the present disclosure, each transfer function of the at least one transfer function may be functionally equivalent to a plurality of sequential uplink signal processing modules.

In another non-limiting embodiment of the present disclosure, an apparatus may comprise a memory, at least one transceiver, and at least one processor communicatively coupled with the memory and the at least one transceiver. The at least one processor may be configured to receive a downlink transport block at a physical layer of a distributed unit (DU) of a radio access network (RAN) and generate a plurality of sub-transport blocks by processing the received downlink transport block, where the plurality of sub-transport blocks are mapped to a plurality of symbols. The at least one processor may be further configured to process the plurality of sub-transport blocks sequentially to generate the plurality of symbols, wherein the plurality of sub-transport blocks are processed using at least one transfer function. The at least one processor may be further configured to transmit the plurality of symbols to a radio unit (RU) of the RAN for transmission to a user equipment (UE).

In another non-limiting embodiment of the present disclosure, the at least one processor may be further configured to buffer and process the plurality of symbols at the RU and transmit the processed symbols one by one over the air to the UE.

In another non-limiting embodiment of the present disclosure, the at least one processor may be configured to transmit the plurality of symbols to the RU by transmitting one symbol of the plurality of symbols at a time to the RU.

In another non-limiting embodiment of the present disclosure, the at least one processor may be configured to transmit the plurality of symbols to the RU by transmitting multiple symbols of the plurality of symbols at a time to the RU.

In another non-limiting embodiment of the present disclosure, a time difference between the generation of a symbol at the DU and the transmission of the symbol to the UE may include time consumed in transmission of the symbol from the DU to the RU and time taken by the RU for buffering and processing the symbol.

In another non-limiting embodiment of the present disclosure, each transfer function of the at least one transfer function may be functionally equivalent to a plurality of sequential downlink signal processing modules.

In another non-limiting embodiment of the present disclosure, each symbol of the plurality of symbols may be an orthogonal frequency division multiplexing (OFDM) symbol.

In a further non-limiting embodiment of the present disclosure, an apparatus may comprise a memory, at least one transceiver, and at least one processor communicatively coupled with the memory and the at least one transceiver. The at least one processor may be configured to receive a plurality of symbols sequentially at a physical layer of a distributed unit (DU) of a radio access network (RAN), where the plurality of symbols may comprise at least one set of symbols, where each set of the at least one set of symbols comprises at least one first symbol followed by a second symbol, and where the second symbol is a reference symbol. The at least one processor may be further configured to generate at least one sub-transport block by processing each of the at least one set of symbols upon reception of a corresponding reference symbol, where the at least one set of symbols is processed using at least one transfer function. The at least one processor may be further configured to generate an uplink transport block for conveyance to a Medium Access Control layer of the DU by processing the generated at least one sub-transport block.

In another non-limiting embodiment of the present disclosure, each transfer function of the at least one transfer function may be functionally equivalent to a plurality of sequential uplink signal processing modules.

In another non-limiting embodiment of the present disclosure, a non-transitory computer readable media may store one or more instructions executable by at least one processor, the one or more instructions may comprise one or more instructions for receiving a downlink transport block at a physical layer of a distributed unit (DU) of a radio access network (RAN). The one or more instructions may further comprise one or more instructions for generating a plurality of sub-transport blocks by processing the received downlink transport block, where the plurality of sub-transport blocks are mapped to a plurality of symbols. The one or more instructions may further comprise one or more instructions for processing the plurality of sub-transport blocks sequentially to generate the plurality of symbols, where the plurality of sub-transport blocks are processed using at least one transfer function. The one or more instructions may further comprise one or more instructions for transmitting the plurality of symbols to a radio unit (RU) of the RAN for transmission to a user equipment (UE).

In another non-limiting embodiment of the present disclosure, a non-transitory computer readable media may store one or more instructions executable by at least one processor, the one or more instructions may comprise one or more instructions for receiving a plurality of symbols sequentially at a physical layer of a distributed unit (DU) of a radio access network (RAN), where the plurality of symbols comprise at least one set of symbols, where each set of the at least one set of symbols comprises at least one first symbol followed by a second symbol, and where the second symbol is a reference symbol. The one or more instructions may further comprise one or more instructions for generating at least one sub-transport block by processing each of the at least one set of symbols upon reception of a corresponding reference symbol, where the at least one set of symbols is processed using at least one transfer function. The one or more instructions may further comprise one or more instructions for generating an uplink transport block for conveyance to a Medium Access Control layer of the DU by processing the generated at least one sub-transport block.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Further aspects and advantages of the present disclosure will be readily understood from the following detailed description with reference to the accompanying drawings. Reference numerals have been used to refer to identical or functionally similar elements. The figures together with a detailed description below, are incorporated in and form part of the specification, and serve to further illustrate the embodiments and explain various principles and advantages, in accordance with the present disclosure wherein:

FIG. 6 shows a physical layer slot 600 divided into different time windows, in accordance with some embodiments of the present disclosure.

FIG. 7 shows a processing diagram 700 for downlink physical layer processing and over the air transmission, in accordance with some embodiments of the present disclosure.

Figure 1A:
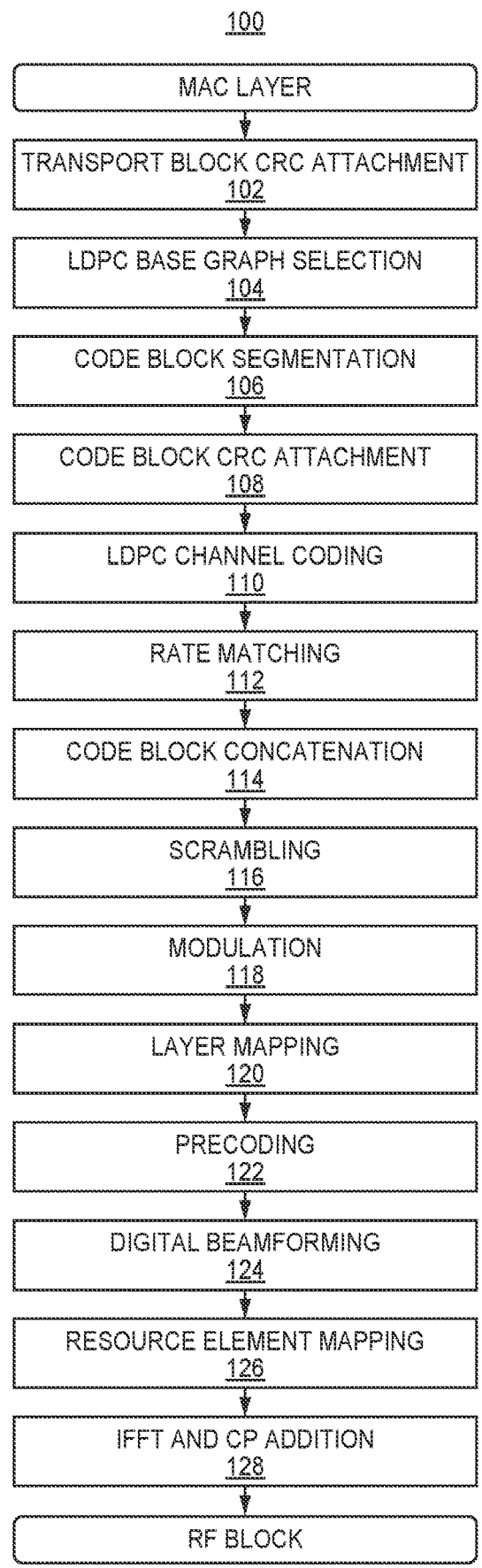
FIG. 1A shows physical layer processing operations for Physical Downlink Shared Channel, in accordance with some embodiments of the present disclosure.

It should be appreciated by those skilled in the art that any block diagrams herein represent conceptual views of the illustrative systems embodying the principles of the present disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present disclosure described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus preceded by "comprises . . . a" does not, without more constraints, preclude the existence of other elements or additional elements in the system.

The terms like "at least one" and "one or more" may be used interchangeably throughout the description. The terms like "a plurality of" and "multiple" may be used interchangeably throughout the description. The terms like "base station" and "gNodeB" may be used interchangeably throughout the description.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

The $5^{th}$ generation wireless access technology is also known as NR (new radio). It follows other 3rd Generation Partnership Project (3GPP) series of standards related to GSM, CDMA, and LTE. Different use cases of 5G NR technology may include Enhanced Mobile Broadband (eMBB), Massive machine type communications (mMTC), and Ultra Reliable Low Latency Communication (URLLC). In 5G multiple numerologies (waveform configuration like subframe spacing) are supported and a radio frame structure may vary depending on a type of numerology used. In 5G, regardless of numerology used, the length of one radio frame is 10 ms and one radio frame contains 10 sub-frames each having a length of 1 ms. Thus, a subframe is of fixed duration (i.e., 1 ms) whereas slot length varies based on subcarrier spacing. Each slot occupies either 14 Orthogonal Frequency Division Multiplex (OFDM) symbols or 12 OFDM symbols based on normal cyclic prefix and extended cyclic prefix respectively. In the present disclosure, it is assumed that one slot contains 14 OFDM symbols. However, the present disclosure is not limited thereto.

There are mainly three components in a 5G NR network: core network, base stations, and user equipment. A connection from a base station to a user equipment is known as downlink which uses different channels for carrying different data and control information. A connection from the user equipment to the base station is known as uplink which uses different channels for carrying different data and control information. The base station may comprise a central unit (CU), distributed unit(s) (DU), and radio unit(s) (RU). The 5G wireless interface used for communicating with the user equipment employs two planes (i.e., a control plane and a user plane) and includes multiple layers for each plane. Some of the multiple layers for both the control plane and user plane are a physical (PHY) layer, a media access control (MAC) layer, a radio link control (RLC) layer, and a packet data convergence protocol (PDCP) layer. The control plane also includes a radio resource control (RRC) layer and a non-access stratum (NAS) layer, while the user plane also includes a service data adaptation protocol (SDAP) layer. The PHY layer is also referred to as Layer 1, and the MAC, RLC, and PDCP layers are also collectively referred to as Layer 2. Layer 3 of the control plane includes the RRC and NAS layers, while Layer 3 of the user plane includes the SDAP layer. The 5G wireless interface also makes use of certain radio frequency (RF) functions (also referred to here collectively as "RF block") that transform baseband data output by the PHY layer into downlink analog RF signals for radiation from an antenna array and that transform uplink analog RF signals received via an antenna array into uplink baseband data for input to the PHY layer.

As described in the background section, the CU and DUs are designed to run on or in the "cloud" such that they can horizontally and vertically scale computing resources based on traffic demand. The CU comprises non-real time processing modules/functions such as, but limited to, radio resource management, call processing, hand over, and user-plane encryption. These functions require minimal real-time performance and the latency requirements are also of dozens of milliseconds. On the other hand, the DU comprises real time processing modules including channel coding, access network scheduling, link adaptation, accurate RU transmission and reception, power control, interference coordination, retransmission, modulation, MIMO processing etc.

For 5G NR, the physical layer is typically implemented in the DU and includes the real-time signal processing like channel coding, modulation, MIMO processing, accurate RU transmission and reception etc. Implementing real time processing for the physical layer in the DU on conventional COTS hardware poses the significant challenges of non-deterministic latency and computationally intensive processing requirements for certain real time computations. Moreover, the COTS hardware platforms consume huge amounts of power for performing computations on huge amounts of data.

Furthermore, the 3GPP specifications for the relevant wireless interface specify the processing that is to be performed in order to transform transport blocks received from the MAC layer into time-domain in-phase and quadrature (IQ) symbols ready for processing by RF block(s).

The various physical-layer processing operations are individually described in the 3GPP specifications (either explicitly or, in the case of some receive chain operations, implicitly by inverting the description of the corresponding transmit chain operations). These physical-layer processing operations are also referred to here as "signal processing modules" or simply "modules." FIGS. 1A and 1B are block diagrams illustrating the various physical-layer operations specified for 5G NR for a transmit chain 100 for Physical Downlink Shared Channel (PDSCH) and a receive chain 150 for Physical Uplink Shared Channel (PUSCH), respectively.

Referring now to FIG. 1A, which illustrates the physical layer processing operations for the transmit chain 100 for the PDSCH, in accordance with some embodiments of the present disclosure. The physical layer processing operations for the transmit chain 100 for the PDSCH include a transport block Cyclic Redundancy Code (CRC) attachment operation 102, a low density parity check (LDPC) base graph selection operation 104, a code block segmentation operation 106, a code block CRC attachment operation 108, a LDPC channel coding operation 110, a rate matching operation 112, a code block concatenation operation 114, a scrambling operation 116, a modulation operation 118, a layer mapping operation 120, a precoding operation 122, a digital beamforming operation 124, a resource element mapping operation 126, and an inverse fast fourier transform (iFFT) operation and cyclic prefix (CP) addition operation 128.

Figure 1B:
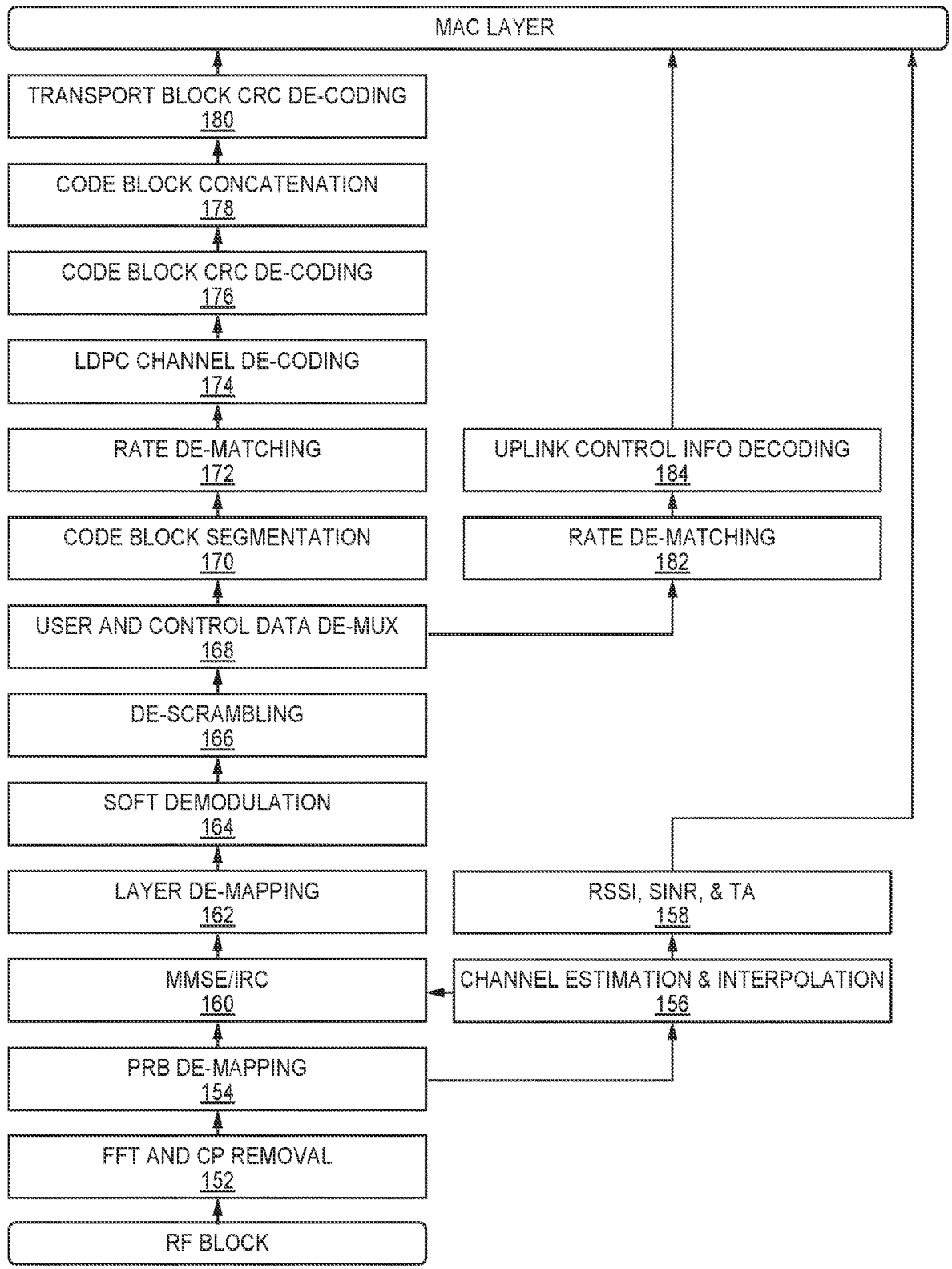
FIG. 1B shows physical layer processing operations for Physical Uplink Shared Channel, in accordance with some embodiments of the present disclosure.

Referring now to FIG. 1B, which illustrates the physical layer processing operations for the receive chain 150 for the PUSCH, in accordance with some embodiments of the present disclosure. The physical layer processing operations for the receive chain 150 for the PUSCH include a fast fourier transform (FFT) operation and cyclic prefix (CP) removal operation 152, a physical resource block (PRB)

de-mapping operation 154, a channel estimation and interpolation operation 156, a received signal strength indicator (RSSI), signal to interference plus noise (SINR), and tone averaging (TA) operation 158, a Minimum Mean Square Error (MMSE)/Interference Rejection Combining (IRC) equalization and combiner operation 160, a layer de-mapping operation 162, a soft demodulation operation 164, a de-scrambling operation 166, and a user and control data de-multiplexing operation 168. For the user data, the receive chain 150 includes a code block segmentation operation 170, a rate de-matching operation 172, a LDPC channel decoding operation 174, a code block CRC decoding operation 176, a code block concatenation operation 178, and a transport block CRC decoding operation 180. For the control data, the receive chain 150 includes a rate de-matching operation 182 and an uplink control information decoding operation 184.

The physical-layer processing operations shown in FIGS. 1A and 1B are individually described in the 3GPP specifications (either explicitly or, in the case of some receive chain operations, implicitly by inverting the individual description of the corresponding transmit chain operations). It is to be understood that FIGS. 1A and 1B each illustrate only one example and that the present disclosure can be used with other wireless interfaces (for example, 4G LTE) and with other physical channels (for example, the Physical Broadcast Channel (PBCH), Physical Downlink Control Channel (PDCCH), Physical Random Access Channel (PRACH), and Physical Uplink Control Channel (PUCCH)). Moreover, additional operations not shown in FIGS. 1A and 1B may also be included, for example, to support fronthaul transmission (for example, IQ compression and decompression). Also, the particular sequence of operations may differ from what is shown in FIGS. 1A and 1B. For example, the sequence of operations is dependent on the functional split used between the DU and RU (or similar entities) and the type of RU employed. For example, where a 7-2 functional split is used with an O-RAN Category A RU, the precoding operation 122 and resource element mapping operation 126 are performed in the DU, whereas the digital beamforming operation 124 is performed in the RU. Where a 7-2 functional split is used with an O-RAN Category B RU, the resource element mapping operation 126 is performed in the DU, whereas the precoding operation 122 and digital beamforming operation 124 are performed in the RU.

Base stations typically implement the physical-layer processing operations individually in accordance with breakdown in the 3GPP specifications, with each of the various physical-layer processing operations described in the 3GPP specifications being implemented as a discrete, separate operation. The input for each such discrete operation is either the output of a different physical-layer operation or the output of the MAC layer (for the downlink) or the RF block (for the uplink). The data used as the input for each discrete operation is typically read from memory, and the data that is output by each discrete operation is typically written to memory. Also, each such discrete operation typically performs its processing on a transport-block-by-transport-block basis, buffering data as necessary. However, as noted above, with the conventional approach, at least some hardware acceleration is typically necessary in order to meet the stringent timing requirements specified for the wireless interface, which makes the conventional approach less suitable for deployment in cloud-based environments.

To overcome these and other challenges, the present disclosure proposes techniques that use transfer functions for performing at least some of the physical layer operations of the wireless interface thereby utilizing computing resources more efficiently.

Figure 2:
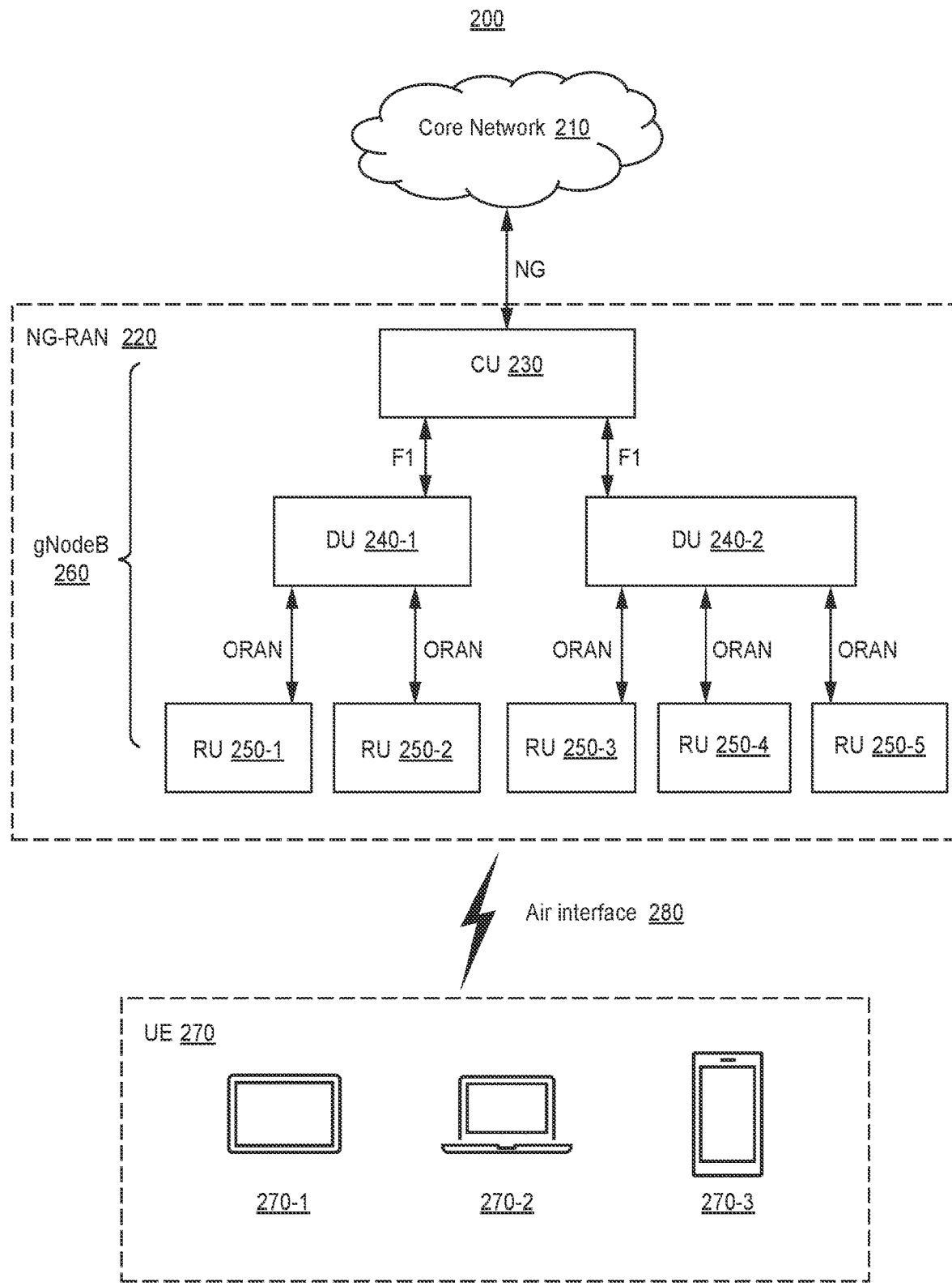
FIG. 2 shows an exemplary environment of a communication system 200 for real-time uplink/downlink physical layer processing for a RAN, in accordance with some embodiments of the present disclosure.

Referring now to FIG. 2, which illustrates an exemplary communication system 200, in accordance with some embodiments of the present disclosure. The communication system 200 may be a 5G wireless system and may comprise a core network (CN) 210, a radio access network (RAN or NG-RAN) 220, and one or more user equipment (UE) 270. The one or more UEs 270 may transmit/receive data and/or information from the core network 210 via the radio access network 220.

In one non-limiting embodiment of the present disclosure, the core network 210 may be a 5G core network in a standalone mode of deployment. The 5G core network enables increased throughput demand that 5G must support. The core network 210 utilizes cloud-aligned, service-based architecture that spans across all 5G functions and interactions including authentication, security, session management etc. The core network 210 further emphasizes network function virtualization (NFV) as an integral design concept with virtualized software functions. The core network 210 may comprise Access and Mobility Management Function and User Plane Function. An interface NG may exist between the CN 210 and the RAN 220. The NG interface supports exchange of signaling information between the RAN 220 and the CN 210. There may be two interfaces under NG interface i.e., control plane interface NG-C (also known as N2 interface) and user plane interface NG-U (also known as N3 interface).

In another non-limiting embodiment of the present disclosure, the mode of deployment of the 5G network may be a non-standalone mode of deployment where 5G services are provided using previous generation infrastructure (e.g., using existing LTE EPC). The non-standalone mode of deployment is lower in cost compared to the standalone mode of deployment and since it uses existing infrastructure, the time required for the network to be operational is reduced. The present disclosure is applicable for both standalone and non-standalone modes of deployments.

The radio access network 220 is also known as a next generation radio access network (NG-RAN). In general, the NG-RAN 220 consists of a plurality of logical base stations (gNBs) 260 interconnected with the core network 210 through the NG interface. A gNB 260 is a logical 5G radio node, equivalent to NodeB of 3G-UMTS and eNodeB of 4G-LTE. The gNBs 260 may be interconnected through Xn interfaces. Each gNB 260 may comprise a control unit (CU) 230, at least one distributed unit (DU) 240-1, 240-2, . . . , 240-n, and at least one radio unit (RU) 250-1, 250-2, . . . , 250-n. The at least one distributed unit (DU) may be collectively represented by reference numeral 240 and the at least one radio unit (RU) may be collectively represented by reference numeral 250. In general, the CU and DU support 1:N configuration i.e., one CU may support multiple DUs and one DU may support multiple RUs.

Although FIG. 2 (and the description set forth below more generally) is described in the context of a 5G NR embodiment in which the base station 260 is partitioned into a CU 230, DUs 240, and RUs 250 and some physical-layer processing being performed in the DU 240 with the remaining physical-layer processing being performed in the RU 250, it is to be understood that the techniques described below for using transfer functions to implement at least some of the physical layer processing for a wireless interface can be used with other wireless interfaces (for example, 4G LTE) and with other ways of implementing a base station (for example, using a conventional baseband band unit (BBU)/remote radio head (RRH) architecture or single entity architecture such as a "femtocell"). Accordingly, references to a CU, DU, or RU in this description and associated figures can also be considered to refer more generally to any entity (including, for example, any "base station" or "RAN" entity) implementing any of the functions or features described here as being implemented by a CU, DU, or RU.

In one non-limiting embodiment of the present disclosure, the CU 230 may be partitioned into two sub-units one of which may comprise control plane functions (CU-CP) and the other of which may comprise user plane functions (CU-UP). The sub-units CU-CP and CU-UP may be interconnected through a point-to-point interface E1. Each CU 230 may be interconnected with at least one DU 240 and each DU 240 may be interconnected with at least one RU. A CU and a DU may be interconnected via F1 interface. Specifically, a CU-CP may be interconnected with a DU via a F1-C interface and a CU-UP may be interconnected with a DU via a F1-U interface. It may be worth noting here that NG, Xn, and F1 are logical interfaces. An ORAN compliant fronthaul interface may be adopted for interconnecting the at least one RU 250 and the at least one DU 240.

In one non-limiting embodiment of the present disclosure, a plurality of user equipment (UE) 270-1, 270-2, . . . , 270-3 (collectively represented as UE 270) may communicate with the RUs 250 via a wireless air interface 280. A user equipment 270 may be implemented as, or known as an access terminal, a subscriber station, a subscriber unit, a mobile station, a remote station, a remote terminal, a user terminal, a user agent, a user device, user equipment, a user station, or some other terminology. In some implementations the user equipment may be a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate using the 3GPP 5G NR wireless protocol.

The air interface 280 may include a wireless network, such as, but not restricted to, Evolved High Speed Packet Access or HSPA+, Wi-Fi 6 and 6E, Long-Term Evolution (LTE), 5G wireless technology etc. In one embodiment, the air interface 280 may include or otherwise cover networks or subnetworks, each of which may include a 5G compatible wireless data pathway.

Figure 3:
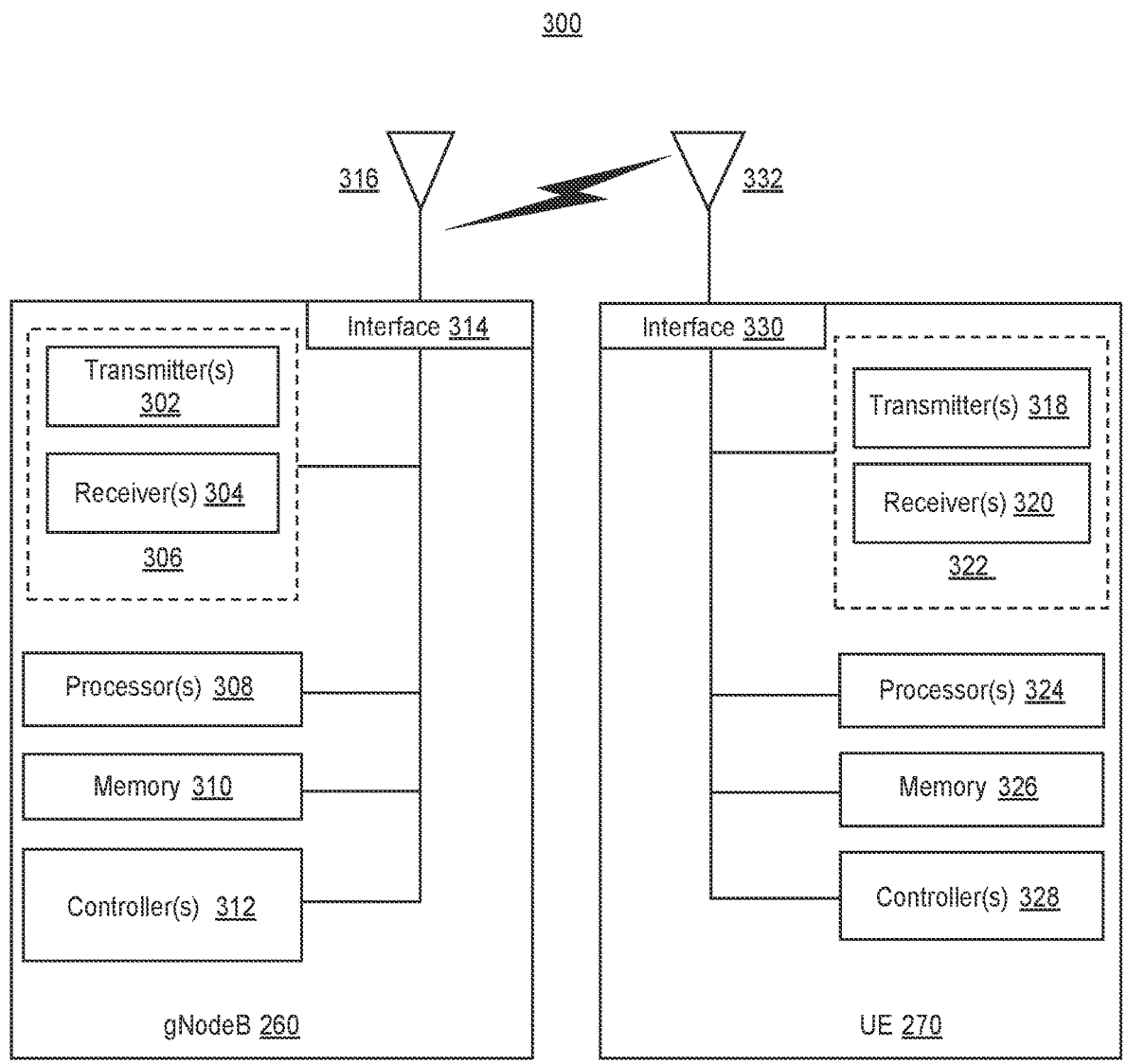
FIG. 3 shows a block diagram 300 of the communication system 200 illustrated in FIG. 2, in accordance with some embodiments of the present disclosure.

Referring now to, FIG. 3, which illustrates a block diagram 300 illustrating key components of the communication system 200, in accordance with some embodiments of the present disclosure. According to an embodiment of the present disclosure, the communication system 200 may comprise, but not limited to, a base station (gNodeB) 260 in communication with a user equipment 270. It may be noted here that the communication system 200 may comprise a plurality of gNodeBs 260 and a plurality of UEs 270. However, for the sake of simplicity, only one gNodeB 260 and only one UE 270 is shown in FIG. 3.

In one non-limiting embodiment of the present disclosure, the gNodeB 260 may comprise at least one transmitter 302, at least one receiver 304, at least one processor 308, at least one memory 310, at least one controller 312, at least one interface 314, and at least one antenna 316. The at least one transmitter 302 may be configured to transmit data/information to the UE 270 using the antenna 316 and the at least one receiver 304 may be configured to receive data/information from the UE 270 using the antenna 316. The at least one transmitter and receiver may be collectively represented as a single transceiver module 306. The at least one controller 312 may be configured to control the operations of various units/components of the gNodeB 260. In one non-limiting embodiment, the at least one processor 308 may be communicatively coupled with transceiver 306 for receiving and transmitting data and/or information.

In one non-limiting embodiment of the present disclosure, the UE 270 may comprise at least one transmitter 318, at least one receiver 320, at least one processor 324, at least one memory 326, at least one controller 328, at least one interface 330, and at least one antenna 332. The at least one transmitter 318 may be configured to transmit data/information to the gNodeB 260 using the antenna 332 and the at least one receiver 320 may be configured to receive data/information from the gNodeB 260 using the antenna 332. The at least one transmitter and receiver may be collectively represented as a single transceiver 322. The at least one controller 328 may be configured to control the operations of various units/components of the UE 270. In one non-limiting embodiment, the at least one processor 324 may be communicatively coupled with transceiver 322 for receiving and transmitting data and/or information.

The processors 308, 324 may include, but not restricted to, microprocessors, microcomputers, micro-controllers, central processing units, state machines, logic circuitries, and/or any devices that manipulate signals based on operational instructions. A processor may also be implemented as a combination of computing devices, e.g., a combination of a plurality of microprocessors or any other such configuration.

The at least one memory 310 may be communicatively coupled to the at least one processor 308 and the at least one memory 326 may be communicatively coupled to the at least one processor 324. Each one of the memories 310, 326 may comprise various instructions, one or more symbols, and one or more transport packets etc. Each one of the memories 310, 326 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth. The at least one processor 308 may be configured to execute one or more instructions stored in the memory 310 and the at least one processor 324 may be configured to execute one or more instructions stored in the memory 326.

The interfaces 314, 330 may include a variety of software and hardware interfaces, for example, a web interface, a graphical user interface, an input device-output device (I/O) interface, a network interface and the like. The I/O interfaces may allow the gNodeB 260 and the UE 270 to communicate with each other and with other input/output devices directly or through other devices. The network interface may allow the gNodeB 260 and the UE 270 to interact with one or more networks either directly or via any other network.

Figure 4:
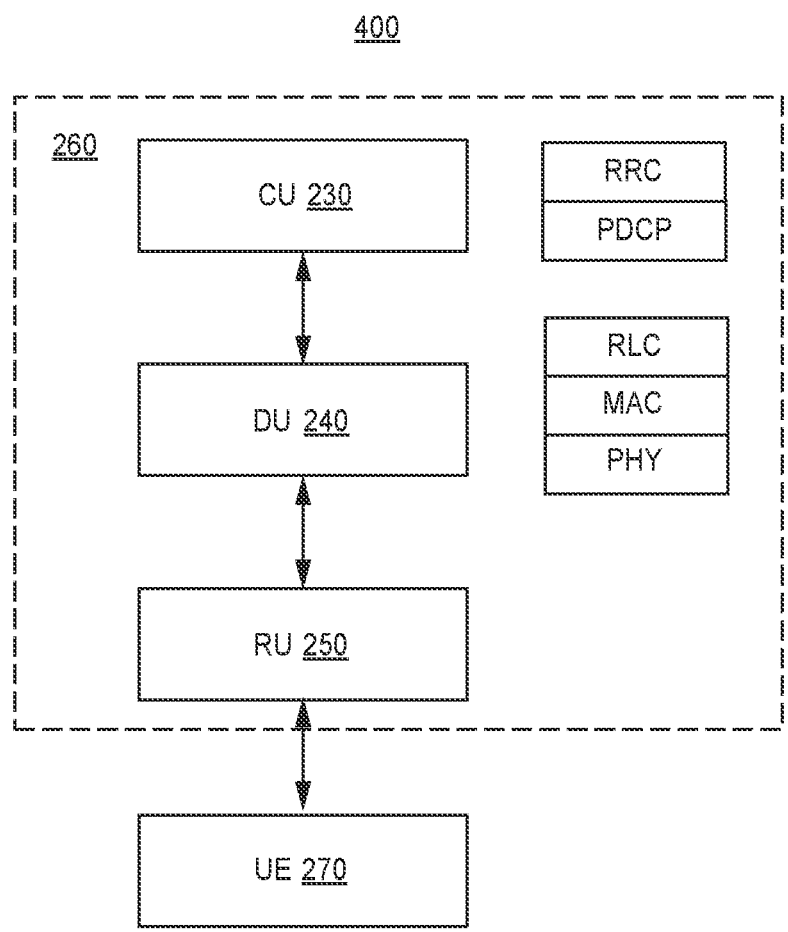
FIG. 4 shows another block diagram 400 of the communication system 200 illustrated in FIG. 2, in accordance with some embodiments of the present disclosure.

Referring now to FIG. 4, which illustrates a simplified block diagram 400 of the communication system 200, in accordance with some embodiments of the present disclosure. As illustrated in FIG. 4, the communication system 200 may comprise a gNodeB 260 in communication with a UE 270. The gNodeB 260 may comprise a CU 230, a DU 240, and an RU 250. It may be noted here that for the sake of simplicity, only one DU and only one RU is shown in FIG. 4.

According to one non-limiting embodiment of the present disclosure, FIG. 4 illustrates a protocol stack of the gNodeB 260. The gNodeB protocol stack is made up of different layers such as a physical (PHY) layer, a medium access control (MAC) layer, a radio link control (RLC) layer, a Packet Data Convergence Protocol (PDCP) layer, and a radio resource control (RRC) layer. In one example, RRC and PDCP layer processing are done by the CU 230 while RLC and MAC layer processing are done by the DU 240. In one embodiment, some of the physical layer processing may be done by the DU 240 and remaining physical layer processing may be done by the RU 250. In another embodiment, all of the physical layer processing may be done by the DU 240 alone.

As per the 3GPP standards, the UE 270 may also comprise a protocol stack, which is not shown here for the sake of brevity. It may be noted that the physical layer forms the backbone of any wireless technology. Thus, the present disclosure is mainly concerned with physical layer processing at the DU 240. The processing at the physical layer for the RAN is described below with the help of process flow diagrams 500-1 to 500-4 as described in FIGS. 5A-5D.

In one non-limiting embodiment of the present disclosure, the physical layer may comprise various channels (or transmit/receive chains) for uplink and downlink signal processing. These channels may carry both User Plane (UP) or Control Plane (CP) information. The downlink channels (or transmit chains) may comprise Physical Broadcast Channel (PBCH), Physical Downlink Shared Channel (PDSCH), and Physical Downlink Control Channel (PDCCH), Synchronization Channel (SCH) for carrying different data/control information in downlink. The uplink channels (or receive chains) may comprise Physical Random Access Channel (PRACH), Physical Uplink Shared Channel (PUSCH), and Physical Uplink Control Channel (PUCCH) for carrying different data/control information in uplink. 5G NR may support a plurality of reference signals. The four main reference signals are the Demodulation Reference Signal (DMRS), Phase Tracking Reference Signal (PTRS), Sounding Reference Signal (SRS), and Channel State Information Reference Signal (CSI-RS). The reference signals may be used in the downlink and uplink.

Figure 5A:
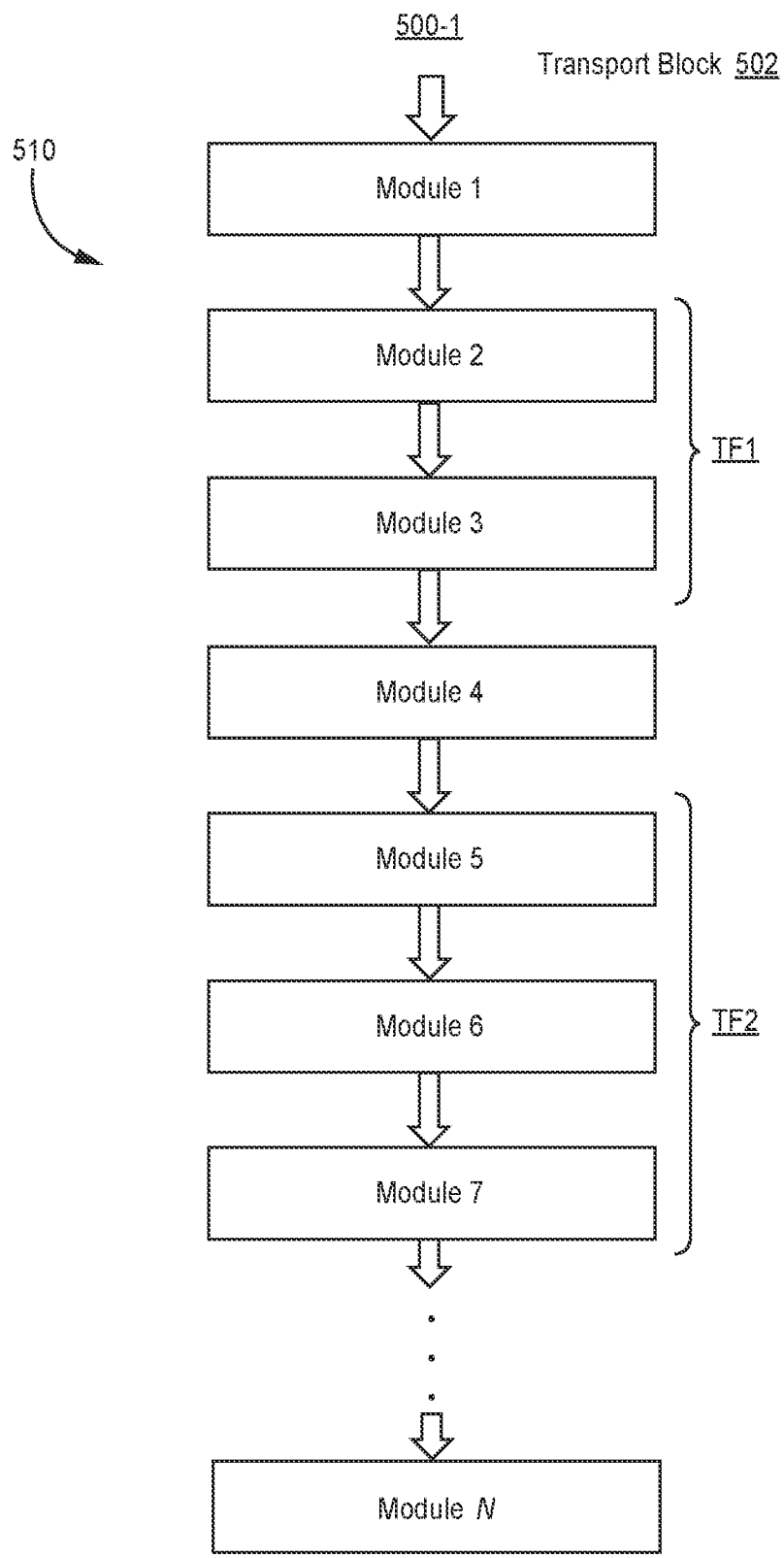
FIG. 5A shows a process flow diagram 500-1 depicting physical layer processing for a RAN, in accordance with some embodiments of the present disclosure.

In one non-limiting embodiment of the present disclosure, each one of the uplink and downlink channels may comprise various signal processing modules to perform various signal/data/information processing operations. For example, FIG. 5A illustrates a process flow diagram 500-1 of a physical layer downlink channel 510 comprising a plurality of downlink signal processing modules 1 to N. Initially, the physical layer may receive a transport block 502 from a higher layer (i.e., MAC layer). In 5G NR, a transport block is the payload which is passed between the MAC and physical layers. The transport block 502 may undergo physical layer processing using different physical layer downlink signal processing modules (modules 1 to N). For the sake of explanation, it is assumed here that the transport block 502 undergoes signal processing in one downlink channel. However, the present disclosure is not limited thereto and the transport block 502 may undergo signal processing in one or more downlink channels depending on the data/information present in the transport block 502.

In one non-limiting embodiment of the present disclosure, the at least one processor 308 may form a plurality of transfer functions for a particular uplink/downlink channel by sequentially executing various signal processing modules on the particular uplink/downlink channel. Thus, a transfer function may be functionally equivalent to a plurality of sequential signal processing modules. For example, in FIG. 5A, conventionally any input data has to first undergo processing at signal processing module 1 then the output of the signal processing module 1 is stored in the memory 310. The signal processing module 2 then reads the input from memory 310 and processes the input, and the output of the signal processing module 2 is stored back in memory 310. In the similar manner, the subsequent signal processing modules read the input from memory 310 and perform signal processing. This approach of signal processing is time consuming and resource intensive as it involves so many processing and memory read/write operations.

In one non-limiting embodiment, to reduce the processing time of the physical layer processing, one or more transfer functions may be generated by sequentially combining multiple signal processing modules. Each transfer function maps each of a universe (or set) of relevant, valid inputs to a first signal processing module to a corresponding output of a final signal processing module. Each transfer function does this without separately reading inputs, and generating and buffering outputs, for any of the signal processing modules other than reading inputs for the first signal processing module and generating and buffering the outputs for the final signal processing module. For example, in FIG. 5A, the operations of the sequential signal processing modules 2 and 3 have been combined into a single transfer function TF1 and the operations of the sequential signal processing modules 5-7 have been combined into a single transfer function TF2. The transfer function TF1 maps each of the universe (or set) of relevant, valid inputs to the signal processing module 2 to a corresponding output of signal processing module 3. Similarly, the transfer function TF2 maps each of the universe (or set) of relevant, valid inputs to the signal processing module 5 to a corresponding output of signal processing module 7.

Figure 5B:
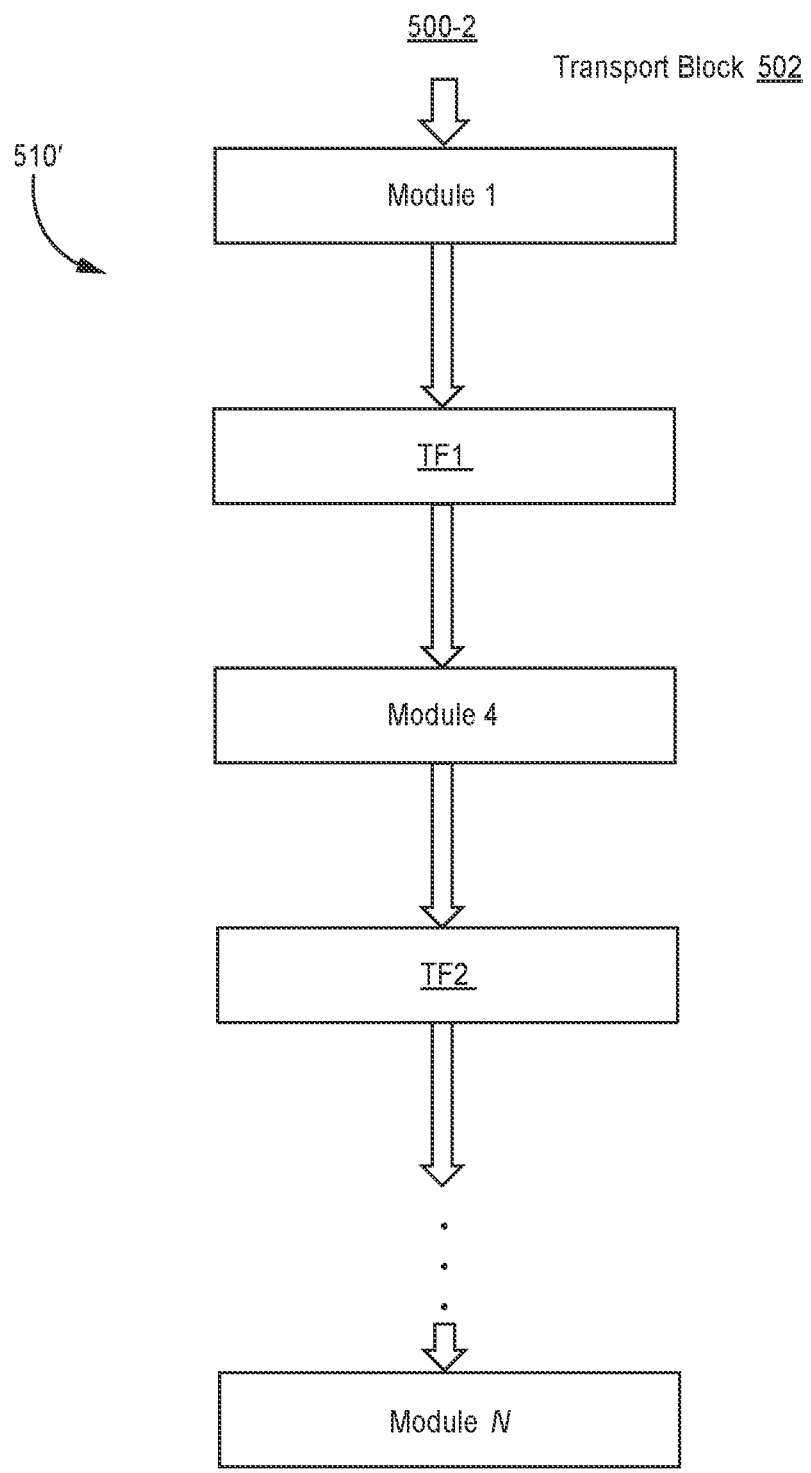
FIG. 5B shows a process flow diagram 500-2 depicting physical layer processing for the RAN using transfer function approach, in accordance with some embodiments of the present disclosure.

Referring now to FIG. 5B, which shows a simplified process flow diagram 500-2 depicting physical layer processing for the RAN using the transfer function approach, in accordance with some embodiments of the present disclosure. As illustrated in FIG. 5B, a physical layer downlink channel 510' comprises one or more transfer functions TF1, TF2. The input data first undergoes processing at signal processing module 1 then the output of the signal processing module 1 is stored in the memory 310. The transfer function TF1 then reads the input from the memory 310 and processes the input, and the output of the transfer function TF1 is stored back in memory 310. The signal processing module 4 reads the input from the memory 310, processes it, and the output of the signal processing module 4 is stored back in the memory 310. In the similar manner, the transfer function TF2 reads input from the memory 310 and processes the input, and the output of the transfer function TF2 is stored back in the memory 310 for further processing by subsequent modules/transfer functions. It is clear from the above that the transfer function approach eliminates the write/read operations between modules 2 and 3, modules 5 and 6, and modules 6 and 7. Furthermore, the number of explicit processing operations has been reduced from 7 (modules 1 through 7) to 4 (module 1, TF1, module 4, TF2). Hence, the transfer function approach reduces the computations and processing operations (e.g., memory read/write operations). Therefore, the overall processing time of the physical layer is reduced.

In one exemplary implementation for the 5G NR PDSCH operations shown in FIG. 1A, the computationally intensive channel coding operations, including, for example, the transport block CRC attachment operation 102, the LDPC base graph selection operation 104, the code block segmentation operation 106, the code block CRC attachment operation 108, and the LDPC channel coding operation 110 may be combined and replaced with a single transfer function that is configured to map each of the universe (or set) of relevant, valid inputs to the transport block CRC attachment operation 102 to a corresponding output of the LDPC channel coding operation 110. In another exemplary implementation for the 5G NR PUSCH operations shown in FIG. 1B, the computationally intensive channel de-coding operations, including, for example, the rate de-matching operation 166, the LDPC decoding operation 168, the code block CRC decoding operation 170, the code block concatenation operation 172, and the transport block CRC decoding operation 174 may be combined and replaced with a single transfer function that is configured to map each of the universe (or set) of relevant, valid inputs to the rate de-matching operation 166 to a corresponding output of the transport block CRC decoding operation 174.

Figure 5C:
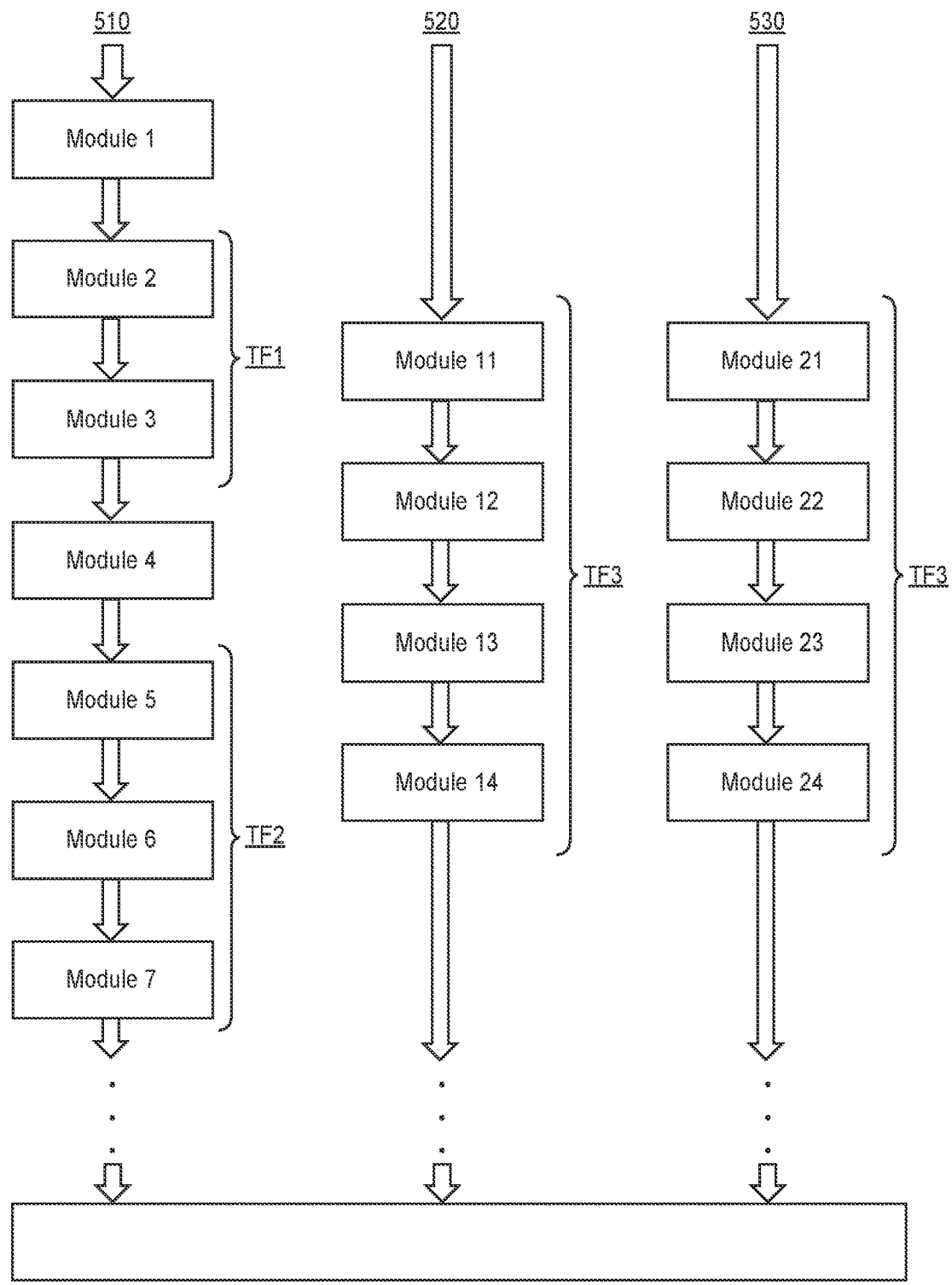
FIG. 5C shows another process flow diagram 500-3 depicting physical layer processing for the RAN, in accordance with some embodiments of the present disclosure.

In one non-limiting embodiment of the present disclosure, multiple physical layer channels may share some common sequential signal processing modules, which may be replaced by common transfer functions. For example, FIG. 5C illustrates two additional physical layer downlink channels 520, 530 each comprising a plurality of downlink signal processing modules. It is assumed in FIG. 5C that the sequential downlink signal processing modules 11, 12, 13, and 14 of the downlink channel 520 are same as the sequential downlink signal processing modules 21, 22, 23, and 24 of the downlink channel 530. The operations of the sequential downlink signal processing modules 11, 12, 13, and 14 may be combined in a single transfer function TF3. The same transfer function TF3 may be used to replace the operations of the downlink signal processing modules 21, 22, 23, and 24 of the downlink channel 530.

Figure 5D:
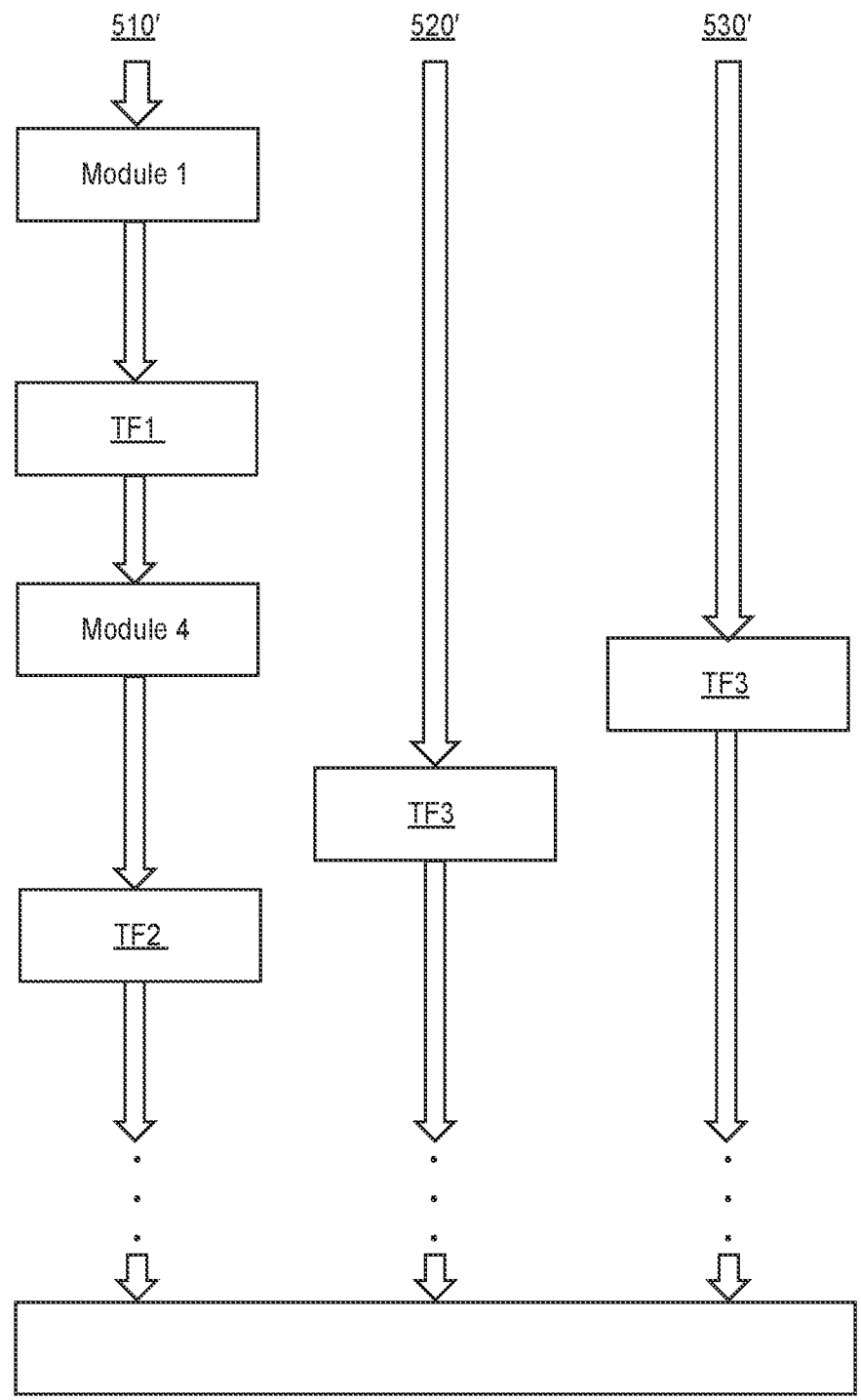
FIG. 5D shows another process flow diagram 500-4 depicting physical layer processing for the RAN using transfer function approach, in accordance with some embodiments of the present disclosure.

Referring now to FIG. 5D, which illustrates a simplified process flow diagram 500-4 for the physical layer processing using the transfer function approach, in accordance with some embodiments of the present disclosure. The simplified process flow diagram 500-4 illustrated in FIG. 5D corresponds to the process flow diagram 500-3 illustrated in FIG. 5C. As illustrated in FIG. 5D, the physical layer downlink channels 520' and 530' may share the common transfer function TF3. It may be worth noting here that the downlink processing described while explaining FIGS. 5A-5B is equally applicable for FIGS. 5C-5D and explanation of the same has been omitted here for the sake of brevity.

In one non-limiting embodiment of the present disclosure, each transfer function can be implemented using, for example, a look-up table (LUT) that contains a respective "row" for each of the valid inputs to the first signal processing module. In such an example, each row of the LUT contains an "input field" in which the input values for that row are stored and an "output field" in which the output values of the final signal processing module corresponding to those input values are stored. The values stored in the output field of each row of the LUT can be determined in an offline process in which the operations for the different signal processing modules are performed in a conventional manner using the corresponding input values as the first input. That is, for each signal processing module, the operations associated with that signal processing module are performed after reading the appropriate input values (which are either the values stored in the input field for the associated row in the case of the first signal processing module or, in the case of the other signal processing modules, are the buffered output values resulting from performing the operations associated with the preceding signal processing module) and the output values resulting from performing the operations associated with each signal processing module are buffered for reading by a subsequent signal processing module or are stored in the output field for that row in the case of the final signal processing module.

Although the following description focuses on modules that perform physical-layer operations for the wireless interface used for wirelessly communicating with the user equipment 270, it is to be understood that other types of modules or operations may be combined with physical-layer modules or operations. One example of such operations includes operations related to communicating over the fronthaul (for example, IQ compression or decompression operations and/or other O-RAN or eCPRI-related transport formatting).

In one non-limiting embodiment of the present disclosure, the at least one processor 308 may compute the lookup table before the communication system 200 is operational. In another embodiment, the lookup table may be computed by a processor external to the communication system 200 and stored in the memory 310.

In one non-limiting embodiment of the present disclosure, the at least one processor 308 may receive the transport block 502 at the physical layer of the DU 240. The transport block 502 may be received from the MAC layer of the DU 240. The at least one processor 308 may process the received transport block 502 to generate a plurality of small transport blocks (sub-transport blocks or code blocks) corresponding to a plurality of OFDM symbols. In one non-limiting embodiment, the at least one processor 308 may be programmed to map a plurality of sub-transport block to a plurality of OFDM symbols. In another non-limiting embodiment, the at least one processor 308 may be programmed to generate 14 sub-transport blocks corresponding to 14 OFDM symbols.

In one non-limiting embodiment of the present disclosure, the transport block 502 comprises a plurality of bits and the at least one processor 308 may be configured to map the plurality of bits to the plurality of OFDM symbols using a mapping table to generate the plurality of sub-transport blocks.

The at least one processor 308 may then sequentially process each of the plurality of sub-transport blocks using one or more downlink transfer functions and one or more downlink signal processing modules to generate the plurality of symbols. For example, as illustrated in FIG. 5B, the at least one processor 308 may sequentially process each of the plurality of sub-transport blocks using the transfer functions TF1, TF2 and the signal processing modules Module 1, Module 4, and Module N to generate the plurality of symbols. The at least one processor 308 may generate multiple symbols at a time (e.g., in case of a multi-core processor) or one symbol at a time.

By segmenting the transport block 502 into a plurality of sub-transport blocks and processing each sub-transport block sequentially, the computational resources are efficiently utilized, and the processing time is reduced. For example, conventionally whole transport block had to undergo processing at each downlink signal processing module. In that case, when the transport block is undergoing processing at one signal processing module, remaining signal processing modules are idle for that duration of time, thereby increasing the processing time/latency. On the other hand, in the present disclosure when a sub-transport block of a transport block 502 is undergoing processing using transfer functions and/or downlink signal processing modules, remaining sub-transport blocks of the transport block 502 are undergoing parallel processing using other transfer functions and/or downlink signal processing modules. Thus, the processing time is further reduced, and the computational resources are efficiently utilized. The free time may be utilized for further improving the real time physical layer processing in the communication system 200.

In one non-limiting embodiment of the present disclosure, the plurality of symbols may be transmitted from the DU 240 to the RU 250. In one embodiment, one symbol at a time may be transmitted from the DU 240 to the RU 250. In another embodiment, the DU 240 may buffer the generated symbols and multiple symbols at a time may be transmitted from the DU 240 to the RU 250. The RU 250 may also buffer the symbols received from the DU 240 (particularly when multiple symbols at a time are received at the RU 250). The RU 250 may process the buffered/received symbols and may transmit one symbol at a time over the air (OTA) to the UE 270. The RU 250 may provide functions such as analog to digital conversion, filtering, power amplification etc.

In one non-limiting embodiment of the present disclosure, each layer can consume a maximum of 1 slot duration for processing of data. Consider one example, where the MAC layer processes data in slot 0, the physical layer processes data in slot 1, the transmission of data from the RU 250 to the UE 270 takes place in one air interface slot (i.e., slot 2). In one embodiment, the RU 250 may perform some of the physical layer processing and may process data in slot 1 and slot 2. In another embodiment, the RU 250 processing may take place in a separate slot. In the present disclosure, it is assumed that the processing at RU 250 occurs in both slot 1 and slot 2.

Referring now to FIG. 6, which illustrates a physical layer slot 600 divided into different time windows, in accordance with one embodiment of the present disclosure. As illustrated in FIG. 6, the physical layer slot (i.e., slot 1) may be divided into 4 sub-slots or windows W1-W4 to enable real-time processing. This division of the physical layer is possible because of computation optimizations, as described above.

In one non-limiting embodiment of the present disclosure, a first window W1 may correspond to L1-L2 interface jitter buffer i.e., a north bound headroom is provided for buffering the transport blocks arriving from the MAC layer. A second window W2 may correspond to the downlink physical layer processing window. All sub-transport blocks corresponding to a transport block may be processed in the second window W2. A third window W3 may correspond to a DU-RU interface distance delay. The DU-RU interface delay may indicate time consumed between transmission of a symbol from the DU 240 and reception of the symbol at the RU 250. The fourth window W4 may correspond to the DU-RU interface jitter buffer zone. The fourth window W4 may indicate a time taken by the RU 250 for buffering and processing a symbol.

In one non-limiting embodiment of the present disclosure, the extra time which was consumed by a transport block in waiting for processing at the physical layer, DU-RU distance delay time, and RU buffering and processing time may be accommodated in single slot (i.e., slot 1), as shown in FIG. 6. Thereby, enabling lower latency processing at the physical layer.

In one non-limiting embodiment of the present disclosure, the plurality of symbols is generated on symbol by symbol basis at the DU physical layer because the plurality of sub-transport blocks are processed sequentially, and each sub-transport block corresponds to one symbol. In one embodiment, each generated symbol of the plurality of symbols may be immediately transmitted on symbol by symbol basis from the DU 240 to the RU 250. In another embodiment, two or more generated symbols may be initially buffered at the DU 240 and then multiple symbols at a time may be transmitted from the DU 240 to the RU 250. The transmission of the symbols from the DU 240 to the RU 250 may consume some time. The RU 250 may buffer and process the received symbols. The RU 250 may take some time in buffering and processing of the symbols.

Referring now to FIG. 7, which illustrates a processing diagram 700 for downlink physical layer processing and over the air (OTA) transmission of symbols, in accordance with one embodiment of the present disclosure. As illustrated in FIG. 7, generation of a symbol at the DU 240 may take time D1 (which corresponds to window W2 of FIG. 6). The generated symbol may be immediately transmitted by the DU 240 to the RU 250. This transmission of symbol from the DU 240 to the RU 250 may take time D2 (which corresponds to window W3 of FIG. 6). Further, the RU 250 may buffer and process the received symbol in time D3 (which corresponds to window W4 of FIG. 6). Thereafter, the RU 250 may sequentially transmit the processed symbol one at a time over the air to the UE 260. Thus, the total time consumed from generation of the symbol till the over the air transmission is a sum total of D1, D2, and D3. The total time may additionally comprise a waiting time corresponding to L1-L2 interface jitter buffer of FIG. 6. The total time may be referred as a flexible window D. Also, the total time consumed after generation of the symbol at the DU 240 till the over the air transmission to the UE 270 is a sum total of D2 and D3. It means that the RU 250 has to wait at least for the time corresponding to the sum of D2 and D3 before it can initiate an over the air transmission of a generated symbol to the UE 270.

Thus, it is clear from above that by using the transfer functions approach and by sequential processing the plurality of sub-transport blocks at the physical layer of the DU 240, the time in processing the entire transport block 502 at the physical layer is significantly reduced. Hence, more time can be allocated for fronthaul transmissions (DU-RU transmission), thereby providing better deployment options.

Figure 8:
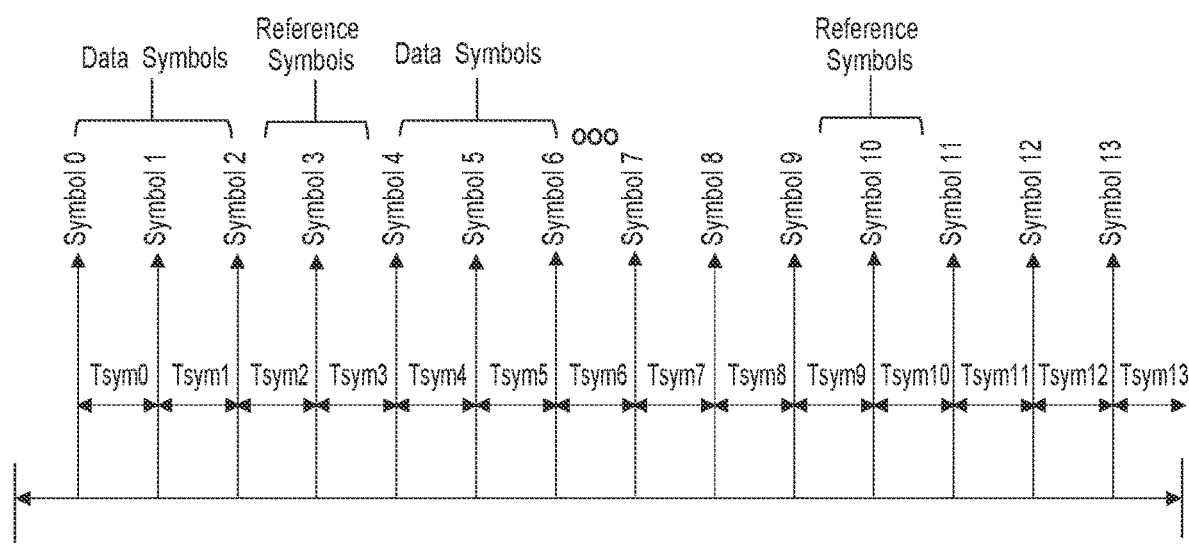
FIG. 8 shows a processing diagram 800 illustrating uplink over the air transmission, in accordance with some embodiments of the present disclosure.

Referring now to FIG. 8, which illustrates a processing diagram 800 for uplink physical layer transmission of symbols, in accordance with one embodiment of the present disclosure. Similar to downlink signal chain (or transmit chain), the uplink signal chain (or receive chain) also comprises one or more uplink channels each comprising one or more uplink signal processing modules. Similar to downlink channels, one or more transfer functions may be generated for each of the uplink channels. The generation of an uplink transfer function for an uplink channel comprises sequentially combining one or more uplink processing modules of that channel. In one embodiment, two or more uplink channels may share one or more common uplink transfer functions.

In one non-limiting embodiment of the present disclosure, the UE 270 may sequentially transmit a plurality of uplink symbols over the air to the RU 250. The plurality of uplink symbols may comprise one or more sets of symbols. Each set of symbols may comprise at least one first symbol followed by a second symbol, where the second symbol is a reference symbol. Thus, the last symbol of each set is a reference symbol. For example, in FIG. 8, the symbols 0, 1, 2, and 3 may form one set of symbols, where symbol 3 is a reference symbol. The RU 250 may sequentially process the received symbols and may forward the processed symbols to the DU 240 for further processing. In one embodiment, the RU 250 may forward a symbol immediately after the symbol is received at the RU 250. In another embodiment, the RU

250 may initially buffer the received symbol and may then forward one or more buffered symbols to the DU 240.

The at least one processor 308 may receive the plurality of symbols sequentially from the RU 250. Upon receiving a reference symbol in a set of symbols, the at least one processor 308 may process all uplink symbols of that set to generate one or more sub-transport blocks. The at least one processor 308 may process the uplink symbols of the set of symbols using one or more uplink processing modules and/or one or more uplink transfer functions. The at least one processor 308 may generate a plurality of sub-transport blocks corresponding to the plurality of symbols after processing all sets of symbols. The at least one processor 308 may then process the plurality of sub-transport blocks to generate an uplink data packet for transmission to the MAC layer of the DU 240.

It may be noted here that similar to downlink, the uplink physical layer time slot is also divided into four windows. Thus, the above-described downlink processing using the transfer function approach is equally applicable for uplink processing also. The explanation of the same is omitted here for the sake of brevity.

Thus, the techniques of the present disclosure can perform real time physical layer processing for uplink and downlink. Also, the techniques of the present disclosure reduce computations and processing operations, thereby optimizing the computing resources and reducing overall physical layer processing time.

Figure 9:
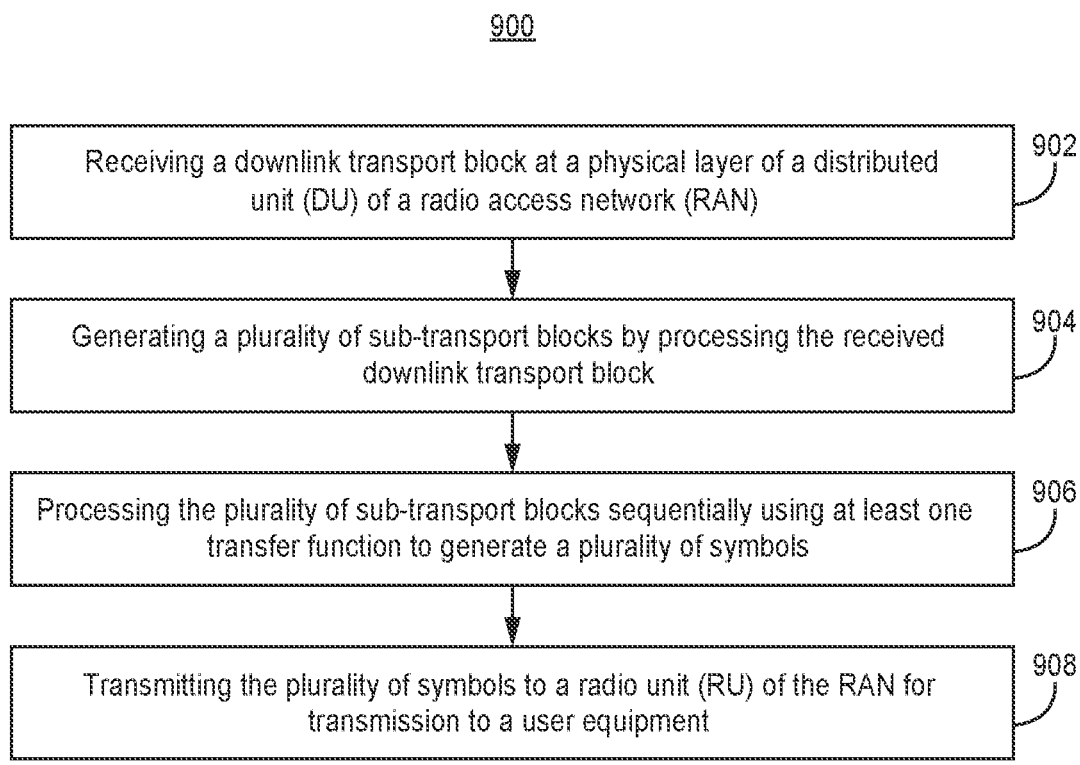
FIG. 9 shows a flowchart of a method 900 for downlink physical layer processing at a distributed unit, in accordance with some embodiments of the present disclosure.

Referring now to FIG. 9, a flowchart is described illustrating an exemplary method 900 for downlink physical layer processing at the DU 240, according to an embodiment of the present disclosure. The method 900 is merely provided for exemplary purposes, and embodiments are intended to include or otherwise cover any methods or procedures for physical layer downlink processing at the DU 240.

The method 900 may include, at block 902, receiving a downlink transport block at a physical layer of a distributed unit (DU) of a radio access network (RAN). The downlink transport block may be received from a MAC layer of the DU 240. For example, the at least one processor 308 of FIG. 3 may be configured to convey the downlink transport block from the MAC layer to the physical layer of the DU 140 of the RAN At block 904, the method 900 may include generating a plurality of sub-transport blocks by processing the received downlink transport block. The plurality of sub-transport blocks may be mapped to a plurality of symbols. For example, the at least one processor 308 of FIG. 3 may be configured to generate the plurality of sub-transport blocks by processing the received downlink transport block.

At block 906, the method 900 may include processing the plurality of sub-transport blocks sequentially to generate the plurality of symbols. The plurality of sub-transport blocks may be processed using at least one transfer function. For example, the at least one processor 308 of FIG. 3 may be configured to process the plurality of sub-transport blocks sequentially to generate the plurality of symbols.

In one non-limiting embodiment of the present disclosure, each transfer function of the at least one transfer function may be functionally equivalent to a plurality of sequential downlink signal processing modules. In another non-limiting embodiment of the present disclosure, the plurality of sub-transport blocks may be further processed using at least one downlink signal processing module.

At block 908, the method 900 may include transmitting the plurality of symbols to a radio unit (RU) 250 of the RAN for transmission to a user equipment (UE) 270. For example, the at least one processor 308 of FIG. 3 may be configured to sequentially transmit the plurality of symbols to the RU 250 of the RAN for transmission to the UE 270.

In one non-limiting embodiment of the present disclosure, transmitting the plurality of symbols to the RU 250 may comprise transmitting one symbol of the plurality of symbols at a time to the RU 250. For example, the at least one processor 308 of FIG. 3 may be configured to transmit one symbol of the plurality of symbols at a time to the RU 250.

In another non-limiting embodiment of the present disclosure, transmitting the plurality of symbols to the RU 250 may comprise transmitting multiple symbols of the plurality of symbols at a time to the RU 250. For example, the at least one processor 208 of FIG. 3 may be configured to transmit multiple symbols of the plurality of symbols at a time to the RU 250.

In one non-limiting embodiment of the present disclosure, the method may further comprise buffering and processing the plurality of symbols at the RU 250. For example, the at least one processor 308 of FIG. 3 may be configured to buffer and process the plurality of symbols at the RU 250.

In one non-limiting embodiment of the present disclosure, the method may further comprise transmitting the processed symbols one by one over the air to the UE 270. For example, the at least one processor 308 in conjunction with the transceiver 306 of FIG. 3 may be configured to transmit the symbols one by one over the air to the UE 270.

In one non-limiting embodiment of the present disclosure, a time difference between the generation of a symbol at the DU 240 and transmission of the symbol to the UE 270 may comprise: time taken in transmission of the symbol from the DU 240 to the RU 250 and time taken by the RU 250 for buffering and processing the symbol.

In one non-limiting embodiment of the present disclosure, each symbol of the plurality of symbols may be an orthogonal frequency division multiplexing (OFDM) symbol.

Figure 10:
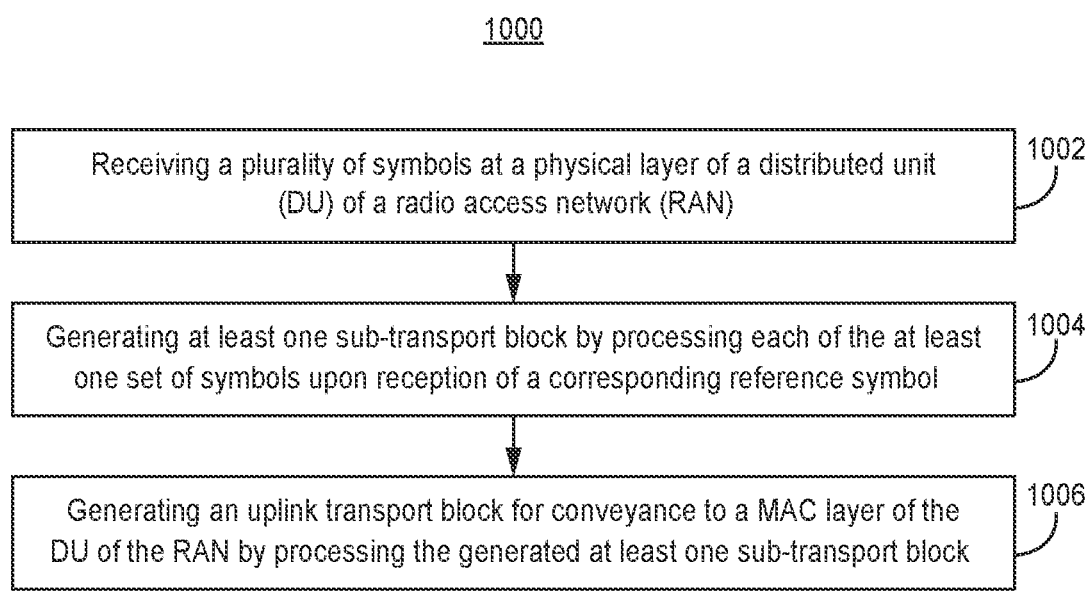
FIG. 10 shows a flowchart of a method 1000 for uplink physical layer processing at a distributed unit, in accordance with some embodiments of the present disclosure.

Referring now to FIG. 10, a flowchart is described illustrating an exemplary method 1000 for physical layer uplink processing at the DU 240, according to an embodiment of the present disclosure. The method 1000 is merely provided for exemplary purposes, and embodiments are intended to include or otherwise cover any methods or procedures for physical layer uplink processing at the DU 240.

The method 1000 may include, at block 1002, receiving a plurality of uplink symbols sequentially at a physical layer of a distributed unit (DU) 240 of a radio access network (RAN). The plurality of symbols may comprise at least one set of symbols and each of the at least one set of symbols may comprise at least one first symbol followed by a second symbol. The second symbol may be a reference symbol. For example, the at least one processor 308 of FIG. 2 may be configured to receive the plurality of uplink symbols sequentially at the DU 240 of the RAN.

At block 1004, the method 1000 may include generating at least one sub-transport block by processing each of the at least one set of symbols upon reception of a corresponding reference symbol. The at least one set of symbols may be processed using at least one transfer function and each of the transfer function of the at least one transfer function may be functionally equivalent to a plurality of sequential uplink signal processing modules. For example, the at least one processor 308 of FIG. 3 may be configured to generate at least one sub-transport block by processing each of the at least one set of symbols upon reception of a corresponding reference symbol.

At block 1006, the method 1000 may include generating an uplink transport block for conveyance to a Medium Access Control layer of the DU 240 by processing the generated at least one sub-transport block. For example, the at least one processor 308 of FIG. 3 may be configured to generate the uplink transport block for conveyance to the MAC layer of the DU by processing the generated at least one sub-transport block.

The above methods 900, 1000 may be described in the general context of computer executable instructions. Generally, computer executable instructions can include routines, programs, objects, components, data structures, procedures, modules, and functions, which perform specific functions or implement specific abstract data types.

The order in which the various operations of the methods 900, 1000 are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable means capable of performing the corresponding functions. The means may include various hardware and/or software component(s) and/or module(s). Generally, where there are operations illustrated in Figures, those operations may have corresponding counterpart means-plus-function components.

It may be noted here that the subject matter of some or all embodiments described with reference to FIGS. 1-8 may be relevant for the methods and the same is not repeated for the sake of brevity.

In a non-limiting embodiment of the present disclosure, one or more non-transitory computer-readable media may be utilized for implementing the embodiments consistent with the present disclosure. A computer-readable media refers to any type of physical memory (such as the memory 310) on which information or data readable by a processor may be stored. Thus, a computer-readable media may store one or more instructions for execution by the at least one processor 308, including instructions for causing the at least one processor 308 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The various illustrative logical blocks, modules, and operations described in connection with the present disclosure may be implemented or performed with a general-purpose processor, discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a plurality of microprocessors, or any other such configuration.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an embodiment with several components in communication with each other does not imply that all such components are required. On the contrary, a variety of optional components are described to illustrate the wide variety of possible embodiments of the disclosed methods and systems.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the appended claims.

Example Embodiments

Example embodiments include the following.

Example 1 includes a method comprising: receiving a downlink transport block at a physical layer of a distributed unit (DU) of a radio access network (RAN); generating a plurality of sub-transport blocks by processing the received downlink transport block, wherein the plurality of sub-transport blocks are mapped to a plurality of symbols; processing the plurality of sub-transport blocks sequentially to generate the plurality of symbols, wherein the plurality of sub-transport blocks are processed using at least one transfer function; and transmitting the plurality of symbols to a radio unit (RU) of the RAN for transmission to a user equipment (UE).

Example 2 includes the method of Example 1, further comprising: buffering and processing the plurality of symbols at the RU; and transmitting the processed symbols one by one over the air to the UE.

Example 3 includes the method of any of Examples 1-2, wherein transmitting the plurality of symbols to the RU comprises: transmitting one symbol of the plurality of symbols at a time to the RU.

Example 4 includes the method of any of Examples 1-3, wherein transmitting the plurality of symbols to the RU comprises: transmitting multiple symbols of the plurality of symbols at a time to the RU.

Example 5 includes the method of any of Examples 1-4, wherein a time difference between the generation of a symbol at the DU and transmission of the symbol to the UE comprises: time consumed in the transmission of the symbol from the DU to the RU; and time taken by the RU for buffering and processing the symbol.

Example 6 includes the method of any of Examples 1-5, wherein each transfer function of the at least one transfer function is functionally equivalent to a plurality of sequential downlink signal processing modules.

Example 7 includes the method of any of Examples 1-6, wherein each symbol of the plurality of symbols is an orthogonal frequency division multiplexing (OFDM) symbol.

Example 8 includes a method comprising: receiving a plurality of symbols at a physical layer of a distributed unit (DU) of a radio access network (RAN), wherein the plurality of symbols comprises at least one set of symbols, wherein each set of the at least one set of symbols comprises at least one first symbol followed by a second symbol, and wherein the second symbol is a reference symbol; generating at least one sub-transport block by processing each of the at least one set of symbols upon reception of a corresponding reference symbol, wherein the at least one set of symbols is processed using at least one transfer function; and generating an uplink transport block for conveyance to a Medium Access Control layer of the DU by processing the generated at least one sub-transport block.

Example 9 includes the method of Example 8, wherein each transfer function of the at least one transfer function is functionally equivalent to a plurality of sequential uplink signal processing modules.

Example 10 includes an apparatus comprising: a memory; at least one transceiver; and at least one processor communicatively coupled with the memory and the at least one transceiver, wherein the at least one processor is configured to: receive a downlink transport block at a physical layer of a distributed unit (DU) of a radio access network (RAN); generate a plurality of sub-transport blocks by processing the received downlink transport block, wherein the plurality of sub-transport blocks are mapped to a plurality of symbols; process the plurality of sub-transport blocks sequentially to generate the plurality of symbols, wherein the plurality of sub-transport blocks are processed using at least one transfer function; and transmit the plurality of symbols to a radio unit (RU) of the RAN for transmission to a user equipment (UE).

Example 11 includes the apparatus of Example 10, wherein the at least one processor is further configured to: buffer and process the plurality of symbols at the RU; and transmit the processed symbols one by one over the air to the UE.

Example 12 includes the apparatus of any of Examples 10-11, wherein the at least one processor is configured to transmit the plurality of symbols to the RU by: transmitting one symbol of the plurality of symbols at a time to the RU.

Example 13 includes the apparatus of any of Examples 10-12, wherein the at least one processor is configured to transmit the plurality of symbols to the RU by: transmitting multiple symbols of the plurality of symbols at a time to the RU.

Example 14 includes the apparatus of any of Examples 10-13, wherein a time difference between the generation of a symbol at the DU and transmission of the symbol to the UE comprises: time consumed in the transmission of the symbol from the DU to the RU; and time taken by the RU for buffering and processing the symbol.

Example 15 includes the apparatus of any of Examples 10-14, wherein each transfer function of the at least one transfer function is functionally equivalent to a plurality of sequential downlink signal processing modules.

Example 16 includes the apparatus of any of Examples 10-15, wherein each symbol of the plurality of symbols is an orthogonal frequency division multiplexing (OFDM) symbol.

Example 17 includes an apparatus comprising: a memory; at least one transceiver; and at least one processor communicatively coupled with the memory and the at least one transceiver, wherein the at least one processor is configured to: receive a plurality of symbols at a physical layer of a distributed unit (DU) of a radio access network (RAN), wherein the plurality of symbols comprises at least one set of symbols, wherein each set of the at least one set of symbols comprises at least one first symbol followed by a second symbol, and wherein the second symbol is a reference symbol; generate at least one sub-transport block by processing each of the at least one set of symbols upon reception of a corresponding reference symbol, wherein the at least one set of symbols is processed using at least one transfer function; and generate an uplink transport block for conveyance to a Medium Access Control layer of the DU by processing the generated at least one sub-transport block.

Example 18 includes the apparatus of Example 17, wherein each transfer function of the at least one transfer function is functionally equivalent to a plurality of sequential uplink signal processing modules.

Example 19 includes a non-transitory computer readable media storing one or more instructions executable by at least one processor, the one or more instructions comprising: one or more instructions for receiving a downlink transport block at a physical layer of a distributed unit (DU) of a radio access network (RAN); one or more instructions for generating a plurality of sub-transport blocks by processing the received downlink transport block, wherein the plurality of sub-transport blocks are mapped to a plurality of symbols; one or more instructions for processing the plurality of sub-transport blocks sequentially to generate the plurality of symbols, wherein the plurality of sub-transport blocks are processed using at least one transfer function; and one or more instructions for transmitting the plurality of symbols to a radio unit (RU) of the RAN for transmission to a user equipment (UE).

Example 20 includes a non-transitory computer readable media storing one or more instructions executable by at least one processor, the one or more instructions comprising: one or more instructions for receiving a plurality of symbols at a physical layer of a distributed unit (DU) of a radio access network (RAN), wherein the plurality of symbols comprises at least one set of symbols, wherein each set of the at least one set of symbols comprises at least one first symbol followed by a second symbol, and wherein the second symbol is a reference symbol; one or more instructions for generating at least one sub-transport block by processing each of the at least one set of symbols upon reception of a corresponding reference symbol, wherein the at least one set of symbols is processed using at least one transfer function; and one or more instructions for generating an uplink transport block for conveyance to a Medium Access Control layer of the DU by processing the generated at least one sub-transport block.

What is claimed is:

1. A method comprising:
   receiving a downlink transport block at a physical layer of a distributed unit (DU) of a radio access network (RAN);
   generating a plurality of sub-transport blocks by processing the received downlink transport block, wherein the plurality of sub-transport blocks are mapped to a plurality of symbols;
   processing the plurality of sub-transport blocks sequentially to generate the plurality of symbols, wherein the plurality of sub-transport blocks are processed using at least one transfer function; and
   transmitting the plurality of symbols to a radio unit (RU) of the RAN for transmission to a user equipment (UE).

2. The method of claim 1, further comprising:
   buffering and processing the plurality of symbols at the RU; and
   transmitting the processed symbols one by one over the air to the UE.

3. The method of claim 1, wherein transmitting the plurality of symbols to the RU comprises:
   transmitting one symbol of the plurality of symbols at a time to the RU.

4. The method of claim 1, wherein transmitting the plurality of symbols to the RU comprises:
   transmitting multiple symbols of the plurality of symbols at a time to the RU.

5. The method of claim 1, wherein a time difference between the generation of a symbol at the DU and transmission of the symbol to the UE comprises:
   time consumed in the transmission of the symbol from the DU to the RU; and
   time taken by the RU for buffering and processing the symbol.

6. The method of claim 1, wherein each transfer function of the at least one transfer function is functionally equivalent to a plurality of sequential downlink signal processing modules.

7. The method of claim 1, wherein each symbol of the plurality of symbols is an orthogonal frequency division multiplexing (OFDM) symbol.

8. A method comprising:
   receiving a plurality of symbols at a physical layer of a distributed unit (DU) of a radio access network (RAN), wherein the plurality of symbols comprises at least one set of symbols, wherein each set of the at least one set of symbols comprises at least one first symbol followed by a second symbol, and wherein the second symbol is a reference symbol;
   generating at least one sub-transport block by processing each of the at least one set of symbols upon reception of a corresponding reference symbol, wherein the at least one set of symbols is processed using at least one transfer function; and
   generating an uplink transport block for conveyance to a Medium Access Control layer of the DU by processing the generated at least one sub-transport block.

9. The method of claim 8, wherein each transfer function of the at least one transfer function is functionally equivalent to a plurality of sequential uplink signal processing modules.

10. An apparatus comprising:
    a memory;
    at least one transceiver; and
    at least one processor communicatively coupled with the memory and the at least one transceiver, wherein the at least one processor is configured to:
    receive a downlink transport block at a physical layer of a distributed unit (DU) of a radio access network (RAN);
    generate a plurality of sub-transport blocks by processing the received downlink transport block, wherein the plurality of sub-transport blocks are mapped to a plurality of symbols;
    process the plurality of sub-transport blocks sequentially to generate the plurality of symbols, wherein the plurality of sub-transport blocks are processed using at least one transfer function; and
    transmit the plurality of symbols to a radio unit (RU) of the RAN for transmission to a user equipment (UE).

11. The apparatus of claim 10, wherein the at least one processor is further configured to:
    buffer and process the plurality of symbols at the RU; and
    transmit the processed symbols one by one over the air to the UE.

12. The apparatus of claim 10, wherein the at least one processor is configured to transmit the plurality of symbols to the RU by:
    transmitting one symbol of the plurality of symbols at a time to the RU.

13. The apparatus of claim 10, wherein the at least one processor is configured to transmit the plurality of symbols to the RU by:
    transmitting multiple symbols of the plurality of symbols at a time to the RU.

14. The apparatus of claim 10, wherein a time difference between the generation of a symbol at the DU and transmission of the symbol to the UE comprises:
    time consumed in the transmission of the symbol from the DU to the RU; and
    time taken by the RU for buffering and processing the symbol.

15. The apparatus of claim 10, wherein each transfer function of the at least one transfer function is functionally equivalent to a plurality of sequential downlink signal processing modules.

16. The apparatus of claim 10, wherein each symbol of the plurality of symbols is an orthogonal frequency division multiplexing (OFDM) symbol.

17. An apparatus comprising:
    a memory;
    at least one transceiver; and
    at least one processor communicatively coupled with the memory and the at least one transceiver, wherein the at least one processor is configured to:
    receive a plurality of symbols at a physical layer of a distributed unit (DU) of a radio access network (RAN), wherein the plurality of symbols comprises at least one set of symbols, wherein each set of the at least one set of symbols comprises at least one first symbol followed by a second symbol, and wherein the second symbol is a reference symbol;
    generate at least one sub-transport block by processing each of the at least one set of symbols upon reception of a corresponding reference symbol, wherein the at least one set of symbols is processed using at least one transfer function; and
    generate an uplink transport block for conveyance to a Medium Access Control layer of the DU by processing the generated at least one sub-transport block.

18. The apparatus of claim 17, wherein each transfer function of the at least one transfer function is functionally equivalent to a plurality of sequential uplink signal processing modules.

19. A non-transitory computer readable media storing one or more instructions executable by at least one processor, the one or more instructions comprising:
- one or more instructions for receiving a downlink transport block at a physical layer of a distributed unit (DU) of a radio access network (RAN);
- one or more instructions for generating a plurality of sub-transport blocks by processing the received downlink transport block, wherein the plurality of sub-transport blocks are mapped to a plurality of symbols;
- one or more instructions for processing the plurality of sub-transport blocks sequentially to generate the plurality of symbols, wherein the plurality of sub-transport blocks are processed using at least one transfer function; and
- one or more instructions for transmitting the plurality of symbols to a radio unit (RU) of the RAN for transmission to a user equipment (UE).

20. A non-transitory computer readable media storing one or more instructions executable by at least one processor, the one or more instructions comprising:
- one or more instructions for receiving a plurality of symbols at a physical layer of a distributed unit (DU) of a radio access network (RAN), wherein the plurality of symbols comprises at least one set of symbols, wherein each set of the at least one set of symbols comprises at least one first symbol followed by a second symbol, and wherein the second symbol is a reference symbol;
- one or more instructions for generating at least one sub-transport block by processing each of the at least one set of symbols upon reception of a corresponding reference symbol, wherein the at least one set of symbols is processed using at least one transfer function; and
- one or more instructions for generating an uplink transport block for conveyance to a Medium Access Control layer of the DU by processing the generated at least one sub-transport block.

* * * * *